(12) United States Patent
Chen et al.

(10) Patent No.: US 11,655,552 B2
(45) Date of Patent: May 23, 2023

(54) METAL OXIDE CORE-SHELL NANOPARTICLES AND APPLICATIONS THEREOF

(71) Applicant: THE BOARD OF TRUSTEES OF THE UNIVERSITY OF ARKANSAS, Little Rock, AR (US)

(72) Inventors: Jingyi Chen, Fayetteville, NC (US); Lauren F Greenlee, Fayetteville, AR (US); Ryan Manso, Fayetteville, AR (US); Prashant Acharya, Fayetteville, NC (US); Cameron C Crane, Hiwassee, AR (US)

(73) Assignee: THE BOARD OF TRUSTEES OF THE UNIVERSITY OF ARKANSAS, Little Rock, AR (US)

( * ) Notice: Subject to any disclaimer, the term of this patent is extended or adjusted under 35 U.S.C. 154(b) by 30 days.

(21) Appl. No.: 16/818,249

(22) Filed: Mar. 13, 2020

(65) Prior Publication Data
US 2020/0362469 A1   Nov. 19, 2020

Related U.S. Application Data

(60) Provisional application No. 62/817,915, filed on Mar. 13, 2019.

(51) Int. Cl.
*C25B 11/091* (2021.01)
*C25B 11/051* (2021.01)

(52) U.S. Cl.
CPC .......... *C25B 11/091* (2021.01); *C25B 11/051* (2021.01)

(58) Field of Classification Search
CPC ....... C25B 11/091; C25B 11/051; C25B 1/04; C25B 11/052
See application file for complete search history.

(56) References Cited

U.S. PATENT DOCUMENTS

| | | | |
|---|---|---|---|
| 2014/0162868 A1* | 6/2014 | Greenlee | B01J 23/755 502/337 |
| 2015/0376803 A1* | 12/2015 | Wang | H01M 4/8839 429/480 |
| 2018/0340263 A1* | 11/2018 | Greenlee | B01J 35/002 |

OTHER PUBLICATIONS

Zhishan Luo et al., Fe3O4@NiFexOy Nanoparticles with Enhanced Electrocatalytic Properties for Oxygen Evolution in Carbonate Electrolyte, ACS Applied Materials & Interfaces 2016 8 (43), 29461-29469 (Year: 2016).*

(Continued)

*Primary Examiner* — Alexander W Keeling
*Assistant Examiner* — Mofoluwaso S Jebutu
(74) *Attorney, Agent, or Firm* — J. Clinton Wimbish; Nexsen Pruet, PLLC

(57) ABSTRACT

In an aspect, a method of making a composite core-shell nanoparticle comprises forming a nanoparticle core comprising nickel oxide or iron oxide via thermal decomposition of a nickel complex or an iron complex; and forming an oxide shell over the core, the oxide shell comprising nickel, iron or a mixture thereof. In another aspect, a method of making composite nanoparticles comprises providing a mixture comprising nickel complex and iron complex; and thermally decomposing the nickel and iron complexes to provide the composite nanoparticles comprising $(Ni,Fe)O_x$ alloy. In yet another aspect, a composition comprises composite nanoparticles, the composite nanoparticles including a nickel oxide core and oxide shell, the oxide shell comprising a mixture of nickel and iron.

20 Claims, 11 Drawing Sheets

(56) References Cited

OTHER PUBLICATIONS

Stephanie L. Candelaria et al., Multi-Component Fe-Ni Hydroxide Nanocatalyst for Oxygen Evolution and Methanol Oxidation Reactions under Alkaline Conditions, Nov. 29, 2016, ACS Catalysis 2017 7 (1), 365-379 (Year: 2016).*

Kanchana Somaskandan, Teodor Veres, Mereck Niewczas and Benoit Simard, Surface protected and modified iron based core-shell nanoparticles for biological applications, Oct. 25, 2007, New J. Chem., 2008,32, 201-209 (Year: 2007).*

Mary W. Louie and Alexis T. Bell, An Investigation of Thin-Film Ni-Fe Oxide Catalysts for the Electrochemical Evolution of Oxygen, Journal of the American Chemical Society 2013 135 (33), 12329-12337 (Year: 2013).*

Suchada Sirisomboonchai, Shasha Li, Akihiro Yoshida, Xiumin Li, Chanatip Samart, Abuliti Abudula, and Guoqing Guan, Fabrication of NiO Microflake@NiFe-LDH Nanosheet Heterostructure Electrocatalysts for Oxygen Evolution Reaction, Dec. 14, 2018, ACS Sustainable Chemistry & Engineering 7 (2), 2327-2334 (Year: 2018).*

Ksenia Fominykh et al, Iron-Doped Nickel Oxide Nanocrystals as Highly Efficient Electrocatalysts for Alkaline Water Splitting, ACS Nano 2015 9 (5), 5180-5188 (Year: 2015).*

* cited by examiner

METAL OXIDE CORE-SHELL NANOPARTICLES AND APPLICATIONS THEREOF

RELATED APPLICATION DATA

The present application claims priority pursuant to 35 U.S.C. § 119(e) to U.S. Provisional Patent Application Ser. No. 62/817,915 filed Mar. 13, 2019 which is incorporated herein by reference in its entirety.

STATEMENT OF GOVERNMENT RIGHTS

This invention was partially made with government support under Grant No. CBET 1703827 awarded by the National Science Foundation. The government has certain rights in the invention.

FIELD

The invention generally relates to compositions and methods for conducting electrocatalytic reactions and, in particular, to compositions and methods for enhancing electrocatalytic efficiencies.

BACKGROUND

Water electrolysis can be employed to produce hydrogen and oxygen as an alternative, more environmentally friendly means to generate clean renewable fuels. One of the major obstacles for commercializing this process is the slow kinetics of the four-electron oxygen evolution reaction (OER), which requires a much greater applied potential than the thermodynamic standard potential. Finding catalytic materials that lower the amount of potential applied above the thermodynamic requirement (i.e. overpotential) remains an important task to allow potential viable commercialization of water electrolysis. Electrocatalysts based on noble metals such as Pt, Ru, Ir, and their corresponding oxides have been extensively investigated for OER due to appreciable activity and relatively high stability. Compared to Pt, Ru, Ir, their corresponding oxides were better catalysts with relatively low overpotentials, and thus $RuO_x$ and $IrO_x$ have been recommended as benchmarks in the development of active electrocatalysts for OER. Despite their superior performance, the high cost of these scarce materials makes their choice difficult for large-scale industrial use. Consequently, there is a need for new and inexpensive materials having high catalytic performance for OER to enable practical use in water electrolyzers.

SUMMARY

In one aspect, core-shell metal oxide nanoparticle compositions are described herein which, in some embodiments, exhibit desirable catalytic performance for OER while mitigating material costs. Moreover, scalable synthetic routes are also provided for such nanoparticle compositions. Briefly, a method of making a composite core-shell nanoparticle comprises forming a nanoparticle core comprising nickel oxide or iron oxide via thermal decomposition of a nickel complex or an iron complex; and forming an oxide shell over the core, the oxide shell comprising nickel, iron or a mixture thereof. The oxide shell in some cases is formed via thermal decomposition of an additional nickel complex or an additional iron complex. In some embodiments, the oxide shell comprises a mixture of nickel and iron. In some cases, the nanoparticle core is amorphous.

Methods described herein, in some embodiments, can further comprise functionalizing the oxide shell with one or more ligand species. The one or more ligand species in some cases can enhance dispersion of the composite core-shell nanoparticles in aqueous and/or aqueous based media. Ligand species, for example, can comprise one or more hydrophilic moieties including, but not limited to, carboxyl, hydroxyl, amine, and sulfonic. In some embodiments, ligands comprise one or more of polyethylene glycols, ethylene and/or propylene oxides, and aliphatic acids.

In another aspect, a method of making composite nanoparticles comprises providing a mixture including a nickel complex and iron complex; and thermally decomposing the nickel and iron complexes to provide the composite nanoparticles comprising $(Ni,Fe)O_x$ alloy.

In yet another aspect, a composition comprises composite nanoparticles, the composite nanoparticles including a nickel oxide core and oxide shell, the oxide shell comprising a mixture of nickel and iron. In some cases, the nickel oxide core is amorphous. In some embodiments, the oxide shell is functionalized with one or more ligand species. The one or more ligand species can in some cases enhance dispersion of the composite core-shell nanoparticles in aqueous and/or aqueous based media. Moreover, as described further herein, composite nanoparticles, can be employed as catalyst in the oxygen evolution reaction. In some embodiments, composite nanoparticles having composition and/or structure herein can reduce overpotential of the oxygen evolution reaction. The composite nanoparticles, in some embodiments, can provide a overpotential less than 300 mV at a current density of 10 mA for the oxygen evolution reaction. In some embodiments, the overpotential is less than 280 mV at a current density of 10 mA. $NiO_x$—$NiO_x/FeO_x$ core-mixed shell nanoparticles, for example, can provide these overpotential values.

Nanoparticles having composition, structure and properties described herein can be applied to a variety of electrically conductive materials to provide composite electrodes. Metal oxide core shell nanoparticles described herein can be applied to substrates formed of any desired transition metal or transition metal alloy. Alternatively, the composite nanoparticles can be applied to carbon based electrodes, including electrodes comprising carbon nanoparticles, graphene, carbon paper, and/or glassy carbon. Morphology of electrode substrates can vary. In some embodiments, electrode substrates are solid and non-porous. In other embodiments, electrode substrates can exhibit porous structure. Porous structures can include non-interconnected pores, interconnected pores or combinations thereof. In some embodiments, an electrode substrate exhibits a foam or foam-like structure.

DETAILED DESCRIPTION

Figure 1A:
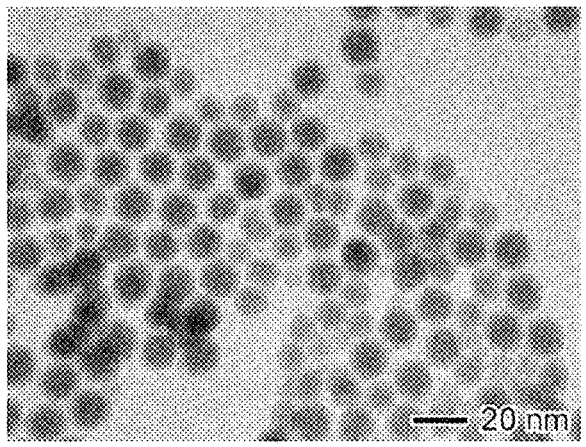
FIG. 1A is a transmission electron microscopy (TEM) image of $NiO_x$—$NiO_x/Fe_x$ core-mixed shell nanoparticles.

Embodiments described herein can be understood more readily by reference to the following detailed description and examples. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9. Similarly, a stated range of "1 to 10" should be considered to include any and all subranges beginning with a minimum value of 1 or more and ending with a maximum value of 10 or less, e.g., 1 to 5, or 4 to 10, or 3 to 7, or 5 to 8.

All ranges disclosed herein are also to be considered to include the end points of the range, unless expressly stated otherwise. For example, a range of "between 5 and 10" or "from 5 to 10" or "5-10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

In one aspect, a new scalable chemical route is disclosed that is based on thermal decomposition of organometallic complexes with temperature control that enables manipulation of both the morphology and crystallinity of Ni—Fe nanocatalysts. This method can produce highly uniform Ni-Fe-based nanostructures with different morphologies (i.e., core-shell and alloy) via either sequential or simultaneous injection. In some embodiments, a nanostructure comprises an $NiO_x$ core with amorphous, disordered nature, which appears to be most similar to $\alpha$-$Ni(OH)_2$, allowing the diffusion of Ni into the $FeO_x$ shell to form the $NiO_x$—$NiO_x/FeO_x$ core mixed shell nanoparticles. This mixed metal hydroxide/oxide shell on the $\alpha$-$Ni(OH)_2$ structured core enables the most active and stable nanocatalyst, which outperforms the comparison $NiO_x/FeO_x$ alloy nanoparticles with a 1:1 composition expected to be active for OER. In some embodiments, a new chemical synthesis method disclosed herein is a solution-based thermal decomposition of organometallic complexes in high-boiling-temperature organic solvent with programmable temperature ramping control. In some instances, slow temperature ramping can improve the uniformity and crystallinity of the resulting nanoparticles.

In another aspect, core-shell structures can be synthesized in some embodiments using a two-step procedure with the first step to synthesize the cores, followed by the second step to coat the cores with the shells. In another aspect, alloy structures can be synthesized in some embodiments using a one-step synthesis of simultaneously injecting both precursors into a solvent. During synthesis, the nanoparticles can be oxidized when exposed to the ambient atmosphere, resulting in Ni-Fe-based nanostructures comprising nickel oxides ($NiO_x$) and iron oxides ($FeO_x$). Details of core-shell and alloy synthesis examples are described below.

Regarding the shape of the nanoparticle cores and/or resultant core-shell nanoparticles, the shape can be spherical, non-spherical, angular, regularly shaped, irregularly shaped, or combinations thereof. Different sizes and/or shapes of nanoparticles may be used in the devices and/or systems noted herein. The mixed metal oxide nanoparticle shells can comprise any thickness not inconsistent with the instant disclosure. Exemplary shell thicknesses are set forth in the table below.

TABLE 1

| Exemplary shell thickness (nm) |
| --- |
| 0.01-5 |
| 0.01-3 |

TABLE 1-continued

Exemplary shell thickness (nm)

0.1-10
0.1-5
0.1-2
0.1-1

EXAMPLE 1

Synthesis of Ni-Fe-Based Nanocatalysts

Three Ni-Fe-based nanostructures with different morphologies were designed and synthesized, the nanostructures comprising a Ni-Fe-based core-shell, Ni-Fe-based alloy, and Fe-Ni-based core-shell. Nanostructure synthesis was achieved through solution-based thermal decomposition of organometallic complexes in high-boiling-temperature organic solvent, as illustrated, for instance, in FIG. 10. In some embodiments, a high-boiling temperature organic solvent has a boiling point of at least 180° C., 190° C., 200° C., 210° C., 220° C., 230° C., 240° C., or 250° C. Temperature control was used to improve the uniformity and crystallinity of the resulting nanoparticles. In some embodiments, the temperature control is programmable. The core-shell structures were synthesized using a two-step procedure with the first step to synthesize the cores, followed by the second step to coat the cores with the shells. Moreover, the alloy structures were prepared in a one-step synthesis by simultaneously injecting both precursors into the solvent. During synthesis, the nanoparticles are oxidized when exposed to the ambient atmosphere, and thus the resulting Ni-Fe-based nanostructures are denoted as nickel oxides ($NiO_x$) and iron oxides ($FeO_x$).

Figure 10:
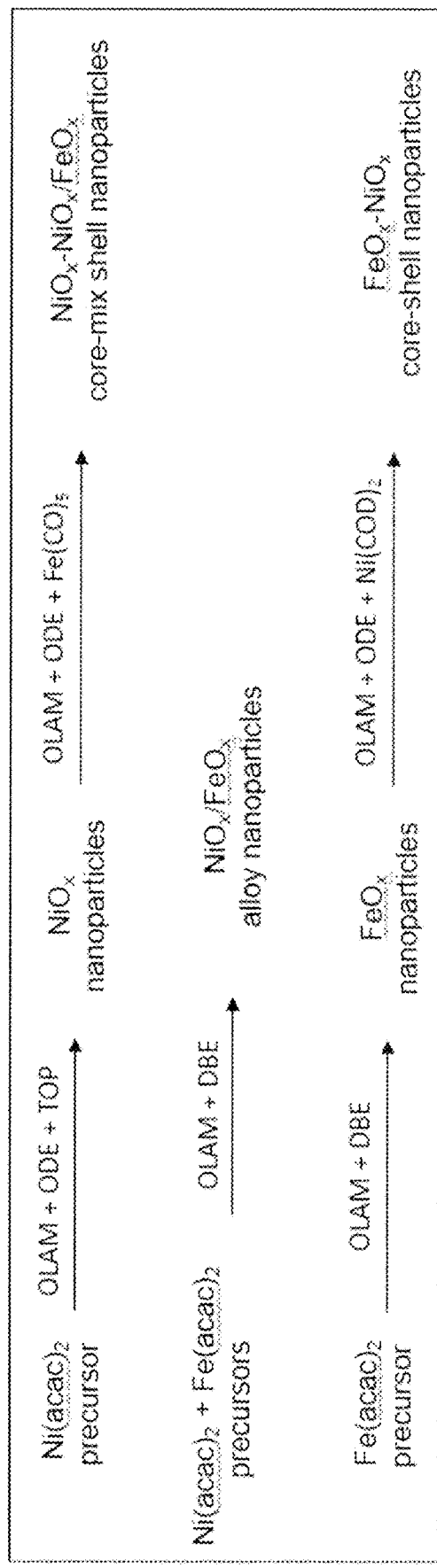
FIG. 10 is a chemical reaction scheme used for producing different nanoparticles.

In some embodiments, $NiO_x$—$Fe_x$ core-shell nanoparticles were synthesized by thermally decomposing $Fe(CO)_5$ complex in the presence of preformed $NiO_x$ seeds, as shown in FIG. 10. FIG. 1A displays a representative TEM image of the reaction product, indicating a core-shell morphology of the nanoparticles. These nanoparticles are relatively uniform with an overall diameter of 16.8±2.0 nm. The size of the core $NiO_x$ nanoparticles is 12.4±0.6 nm, and the shell thickness of the core-shell nanoparticles is estimated to be ~2.2 nm. The x-ray photoelectron spectroscopy (XPS) study indicates that the binding energies of Fe 2p3/2 and Ni 2p3/2 of the core-shell nanoparticles are at 711.5 eV and ~856.4 eV, respectively, confirming the formation of $FeO_x$ and $NiO_x$.

Figure 1B:
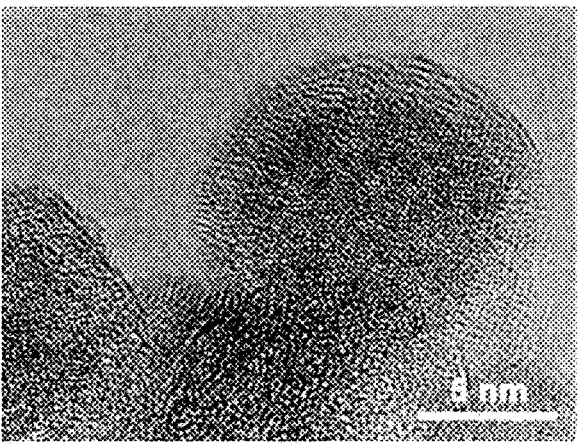
FIG. 1B is a high resolution transmission electron microscopy (HRTEM) image of a nanoparticle shown in FIG. 1A.
Figure 1C:
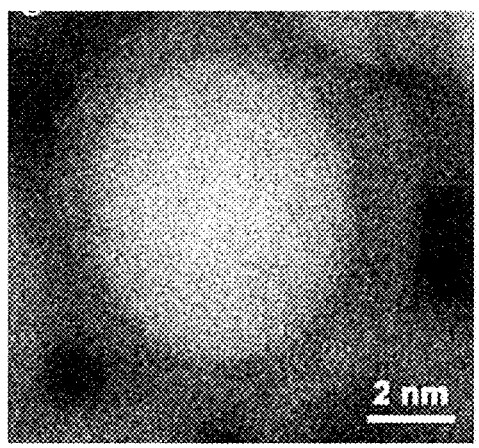
FIG. 1C is a high-angle annular dark-field-scanning transmission electron microscopy (HAADF-STEM) image of a nanoparticle shown in FIG. 1A.
Figure 1D:
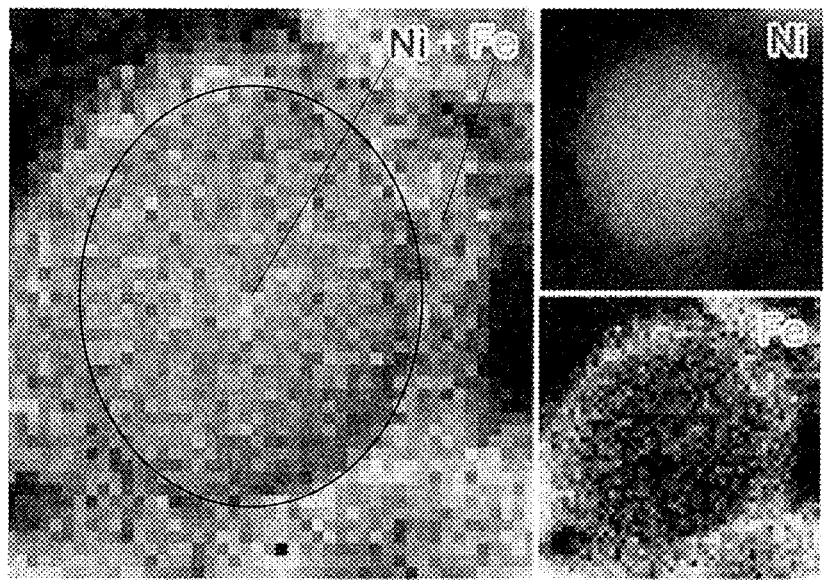
FIG. 1D is an electron energy-loss spectroscopy (EELS) mapping image of the nanoparticle in FIG. 1C showing a Ni core, an Fe shell, and a Ni—Fe overlay showing a $NiO_x$—$NiO_x/FeO_x$ core-mixed shell nanoparticle.

Further characterization of an individual nanoparticle using high-resolution transmission electron microscopy (HRTEM) and high-angle annular dark-field-scanning transmission electron microscopy (HAADF-STEM) clearly showed a core-shell morphology, but rather poor crystallinity (FIGS. 1B and 1C). The corresponding electron energy-loss spectroscopy (EELS) mapping of the individual nanoparticle in the HAADF-STEM image reveals elemental distribution of a Ni—Fe core-shell structure (FIG. 1D). Quantitative analysis of the EELS mapping reveals that the overall atomic ratio of Ni to Fe for individual $NiO_x$—$NiO_x$/$Fe_x$ core-mixed shell nanoparticles is around 1.36 to 1, close to the 1:1 ratio obtained through inductively coupled plasma mass spectrometry (ICP-MS). In some embodiments, the atomic ratio of Ni to Fe for individual $NiO_x$—$NiO_x$/$Fe_x$ core-mixed shell nanoparticles is 0.9 to 1, 1 to 1, 1.1 to 1, 1.2 to 1, 1.3 to 1, 1.4 to 1, 1.5 to 1, 1.6 to 1, 1.7 to 1, 1.8 to 1, 1.9 to 1, or 2 to 1. It is worth noting that Ni is not confined in the core but diffuses into the shell. The composition of the shell was analyzed by extracting the signals of Ni and Fe in the ring region, where the shell is projected in the 2-D EELS map. The quantitative analysis indicates that a 0.39:1 atomic ratio of Ni:Fe is present in the shell corresponding to atomic percent of 28% Ni and 72% Fe. In some embodiments, an atomic ratio of Ni:Fe is present in the shell is 0.1 to 1, 0.15 to 1, 0.2 to 1, 0.25 to 1, 0.3 to 1, 0.35 to 1, 0.4 to 1, 0.45 to 1, 0.5 to 1, 0.55 to 1, or 0.6 to 1. Therefore, the $NiO_x$—$FeO_x$ core-shell nanoparticles are actually made of a $NiO_x$ core and a $NiO_x$/$FeO_x$ mixed shell, denoted as $NiO_x$—$NiO_x$/$Fe_x$ core-mixed shell structures.

Figure 2A:
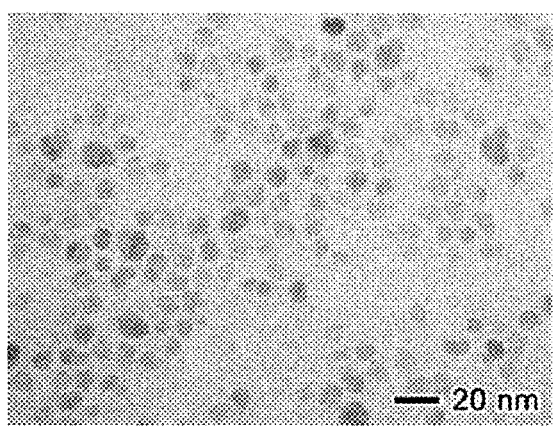
FIG. 2A is a TEM image of $NiO_x/FeO_x$ alloy nanoparticles.
Figure 2B:
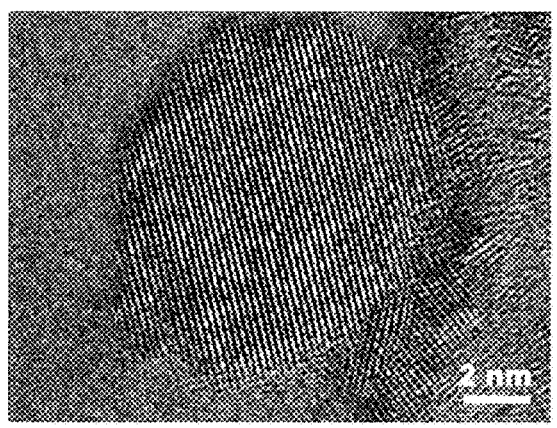
FIG. 2B is an HRTEM image of a nanoparticle shown in FIG. 2A.
Figure 2C:
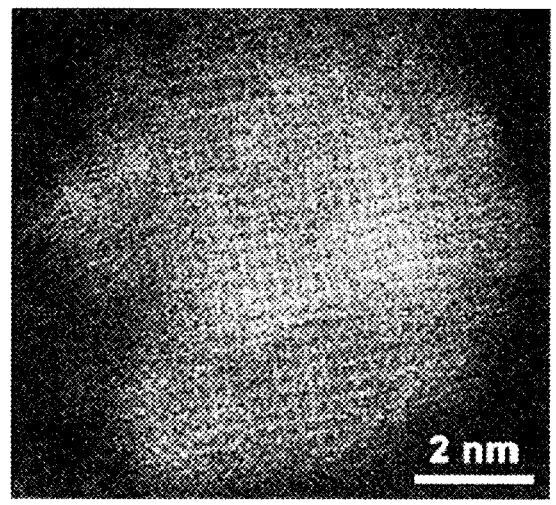
FIG. 2C is an HAADF-STEM image of a nanoparticle shown in FIG. 2A.
Figure 2D:
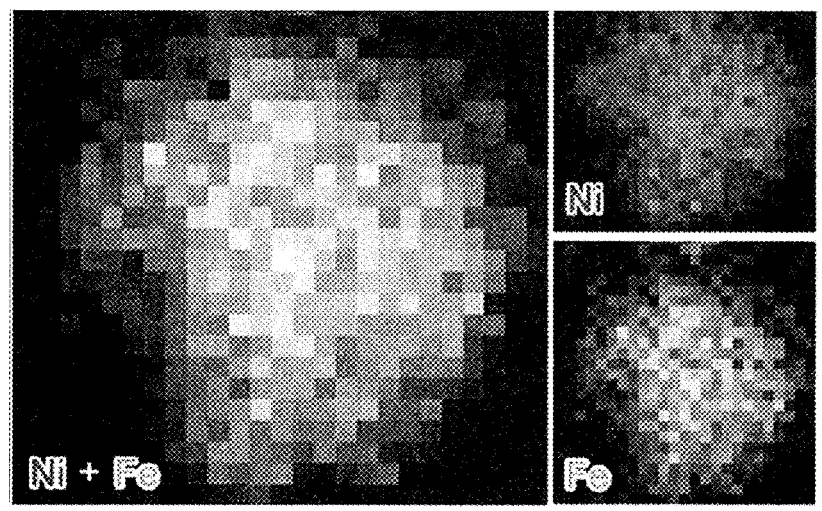
FIG. 2D is an EELS mapping image of the nanoparticle in FIG. 1C showing Ni mapping, Fe mapping, and a Ni—Fe overlay showing a $NiO_x/FeO_x$ alloy nanoparticle.

$NiO_x$/$FeO_x$ alloy nanoparticles were prepared using a similar procedure to that of $NiO_x$ preparation except that the reactant nickel acetylacetonate ($Ni(acac)_2$) alone in the $NiO_x$ synthesis was replaced by the mixture of $Ni(acac)_2$ and iron acetylacetonate ($Fe(acac)_3$) at a 1:1 molar ratio in the alloy nanoparticle synthesis, as shown in FIG. 10. From the TEM image in FIG. 2A, the alloy nanoparticles appear to be more or less spherical in shape but are less uniform and slightly smaller compared to $NiO_x$ nanoparticles. The average size of the alloy nanoparticles is 9.4±1.7 nm. HRTEM image clearly shows the lattice fringes of an alloy nanoparticle, indicating good crystallinity (FIG. 2B). No obvious contrast difference is observed in the HAADF-STEM image, suggesting homogenous distributions of Ni and Fe in a single, or similar density, phase(s) across the entire nanoparticle (FIG. 2C). The corresponding EELS mapping agrees with the observations made from HAADF-STEM image contrast, wherein Ni and Fe are co-localized evenly across the nanoparticle, indicating an alloy composition (FIG. 2D). The XPS spectra of the $NiO_x$/$FeO_x$ nanoparticles indicate that the peak position of the Fe 2p3/2 and Ni 2p3/2 binding energies are 712.1 eV and 857.1 eV, respectively, confirming the oxide formation. The $NiO_x$/$FeO_x$ mixed oxides have higher binding energies than $FeO_x$ (710.7 eV for Fe 2p3/2) or $NiO_x$ (856.6 eV for Ni 2p3/2). Quantitative analysis of the EELS spectra indicates that the Ni/Fe atomic ratio of individual particles is ~0.8, which is close to ICP-MS analysis, showing the overall Ni/Fe atomic ratio of the sample to be 1:1.

Figure 3A:
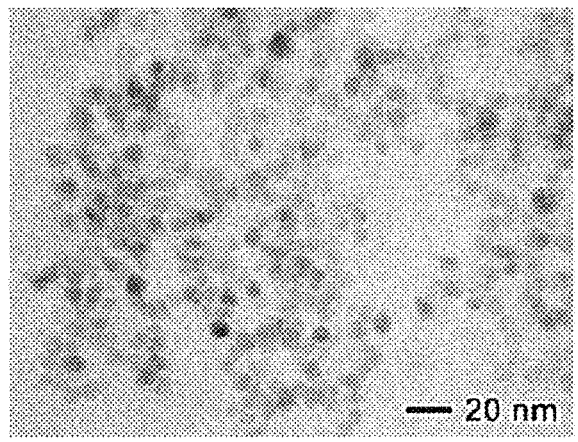
FIG. 3A is a TEM image of $FeO_x$—$NiO_x$ core-shell nanoparticles.
Figure 3B:
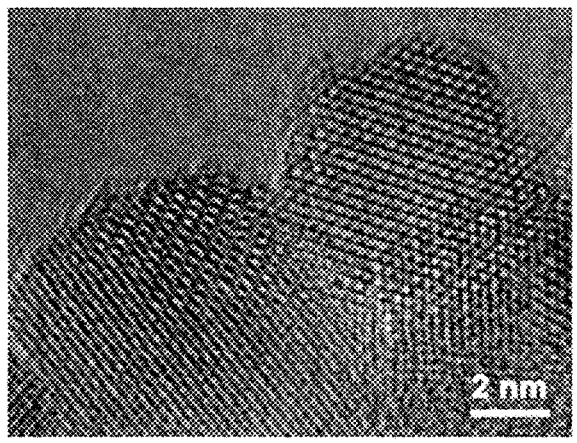
FIG. 3B is an HRTEM image of a nanoparticle shown in FIG. 2A.
Figure 3C:
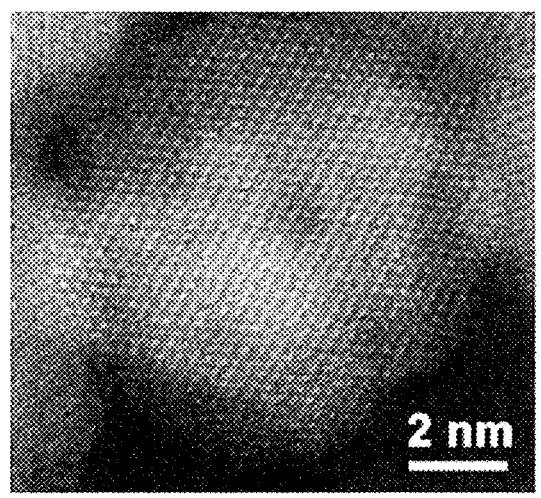
FIG. 3C is an HAADF-STEM image of a nanoparticle shown in FIG. 2A.
Figure 3D:
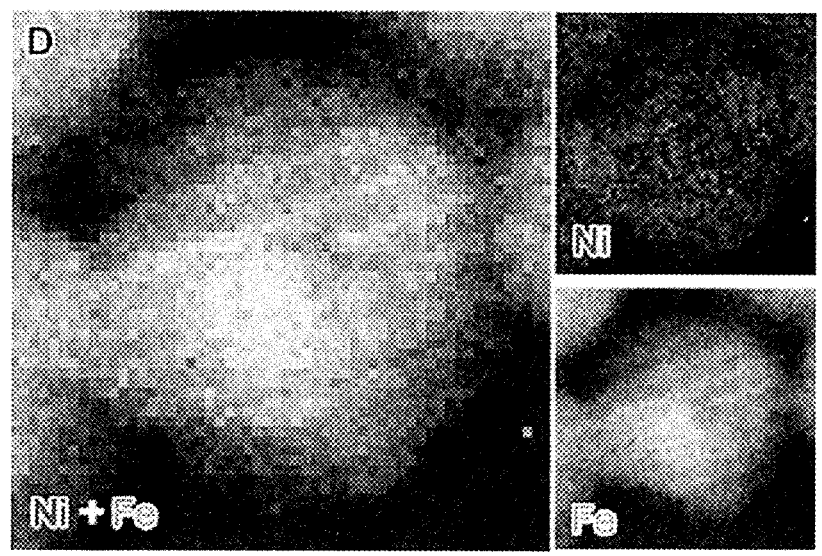
FIG. 3D is an EELS mapping image of the nanoparticle in FIG. 1C showing Ni mapping, Fe mapping, and a Ni—Fe overlay showing a $FeO_x$—$NiO_x$ core-shell nanoparticles.

$FeO_x$—$NiO_x$ core-shell nanoparticles were also synthesized using a two-step procedure by first generating the $FeO_x$ nanoparticles and then coating them with $NiO_x$ shells, as shown in FIG. 10. The $FeO_x$ nanoparticles were prepared by thermally decomposing $Fe(acac)_3$ in a mixture of dibenzyl ether and oleylamine. These $FeO_x$ nanoparticles are spherical in shape with an average diameter of 9.0±1.7 nm according to TEM imaging. The coating process was performed using thermal decomposition of bis(1,5-cyclooctadienenickel(0) ($Ni-(COD)_2$ or Ni-COD) in the presence of the $FeO_x$ nanoparticles. After coating with the Ni shells, the $FeO_x$—$NiO_x$ core-shell nanoparticles have an average diameter of 9.8±1.6 nm, as shown in FIG. 3A. The shell thickness is estimated to be ~0.4 nm. HRTEM result suggests that the nanoparticles exhibit a good crystallinity of the FeOx core, which is covered with an amorphous NiOx shell (FIG. 3B). In the HAADF-STEM image, the contrast does not show an obvious core-shell structure (FIG. 3C); however, the EELS mapping of an individual nanoparticle indicates that the Ni signal covers a slightly larger area, as compared to the Fe signal (FIG. 3D). The Ni/Fe ratio of the entire nanoparticle was calculated to be around 0.078:1, corresponding to atomic percent 7.2% Ni, which is much less than that measured from ICP-MS (18.0% Ni). This difference could be attributed to the presence of pure Ni, possibly from leached Ni or from homogenous, nucleated Ni. The XPS spectra of the $FeO_x$—$NiO_x$ core-shell nanoparticles confirm the oxide composition with the peak positions of the Fe 2p3/2 and Ni 2p3/2 binding energies to be 710.7 eV and 855.5 eV, respectively.

EXAMPLE 2

X-Ray Powder Diffraction of Ni-Fe-Based Nanocatalysts

Figure 4:
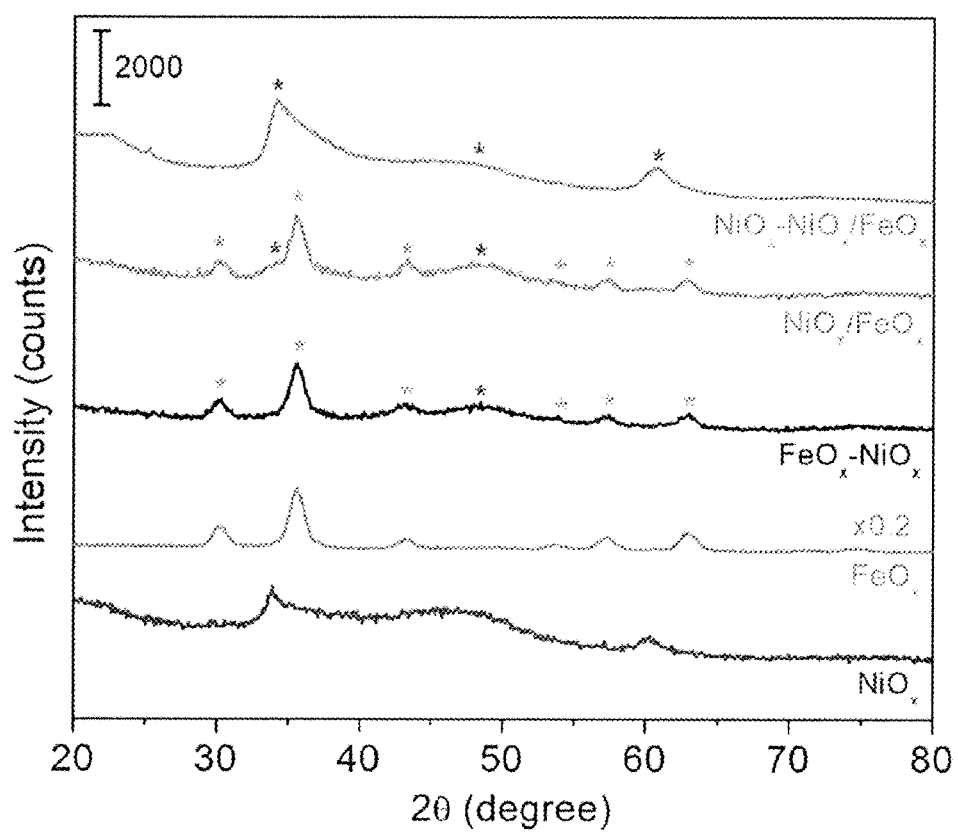
FIG. 4 is a graphical representation of X-ray diffraction (XRD) patterns of different nanoparticles.

The crystal structures of these Ni-Fe-based nanoparticles were analyzed by x-ray powder diffraction (XRD) on the bulk samples, as shown in FIG. 4. The XRD pattern of the $NiO_x$ nanoparticles indicates three broad peaks at 30.4°, 47.0°, and 60.1°, which can be indexed to $\alpha$-$Ni(OH)_2$ with Ni(II) valence. The weak and broad XRD signals are ascribed to the lack of long-range order in the $\alpha$-$Ni(OH)_2$ crystal structure. According to the XRD pattern, the $FeO_x$ nanoparticles could be composed of $\gamma$-$Fe_2O_3$ with Fe(III) valance and/or $Fe_3O_4$ with mixed valence of Fe(II) and Fe(III). Since $Fe(acac)_3$ with $Fe^{3+}$ was used as the precursor, the $FeO_x$ nanoparticles are likely to be $\gamma$-$Fe_2O_3$; however, it is possible Fe(II) could be in the form of $Fe_3O_4$ in some embodiments, because the reaction was carried out under a reducing environment with the presence of oleylamine.

The XRD pattern of the $NiO_x$—$NiO_x/Fe_x$ core-mixed shell nanoparticles is essentially the same as that of $NiO_x$ with three broad peaks at 30.4°, 47.0°, and 60.1°. This observation suggests that the mixed $NiO_x/FeO_x$ shell is largely amorphous, which is consistent with HRTEM result in FIG. 1B. According to our previous study, the thermal decomposition of $Fe(CO)_5$ at the early stage when reaction temperature was relatively low (180° C.) yielded mostly amorphous $FeO_x$; if any crystallinity is present, it should be below the detection limit of XRD (<2%). Based on these results, it is suggested that the core-shell nanoparticles are made of mostly amorphous $\alpha$-$Ni(OH)_2$ and $FeO_x$. For the $NiO_x/FeO_x$ alloy nanoparticles, the XRD pattern appears to be a mixture of $\alpha$-$Ni(OH)_2$ and iron oxide(s). Similar to the $FeO_x$ nanoparticles, the $FeO_x$ in the alloy is likely to be $\gamma$-$Fe_2O_3$ due to the same precursor $Fe(acac)_3$ used in the synthesis. Compared to that of the $FeO_x$ nanoparticles, the XRD pattern of $FeO_x$—$NiO_x$ core-shell nanoparticles exhibits an additional broad peak at 47.0° that can be assigned to $\alpha$-$Ni(OH)_2$. The weak $\alpha$-$Ni(OH)_2$ is due to a small amount (~10 atomic %) of Ni in the $FeO_x$—$NiO_x$ core-shell nanoparticles determined from EELS mapping. In these nanostructures, the presence of $\alpha$-$Ni(OH)_2$ as the primary phase for Ni atoms is promising for the OER because this more disordered phase of nickel hydroxide is now known to be the more active phase for alkaline OER. The presence of peaks for iron oxide phases in some cases does suggest that the Fe atoms are present in a separate oxide phase in the as-synthesized nanoparticles. However, it is also possible that some of the Fe and Ni atoms are present in a combined hydroxide phase, as has been suggested for other Fe—Ni hydroxide/oxide materials.

EXAMPLE 3

X-Ray Absorption Spectroscopy of Ni-Fe-Based Nanocatalysts

Figure 5:
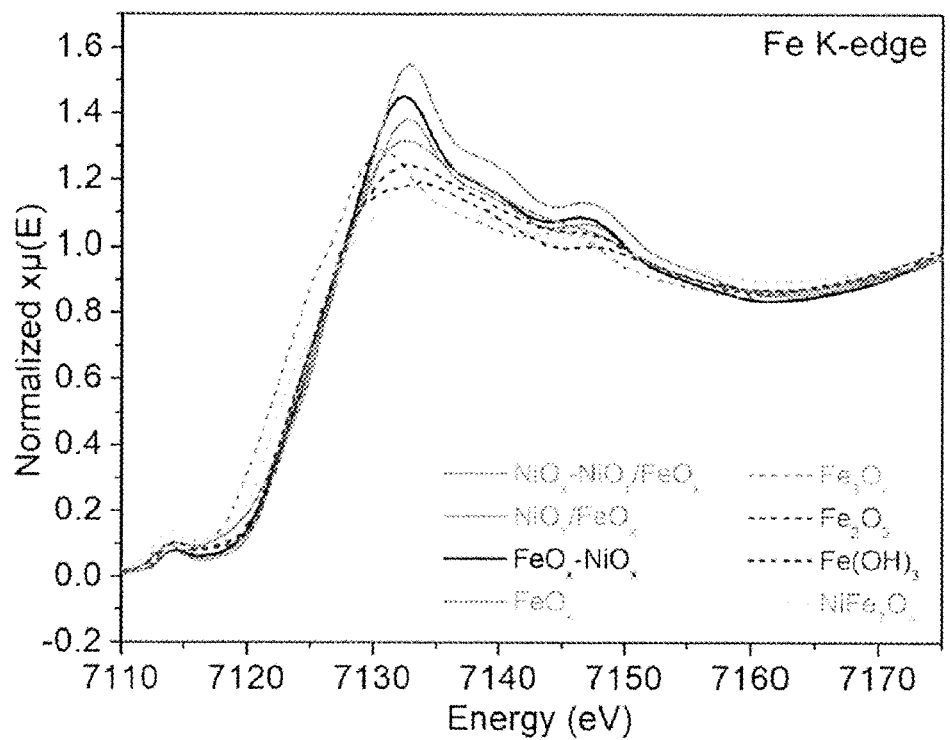
FIG. 5 is a graphical representation of X-ray absorption (XAS) spectra of Fe K-edge for different nanoparticles.

Ex situ XAS was performed on this series of nanocatalysts to examine the collective composition and structure of each nanocatalyst. The spectra for Fe are plotted in FIG. 5. The spectral shapes of the Fe K-edge for $FeO_x$ nanoparticles, $FeO_x$—$NiO_x$ core-shell nanoparticles, and the $NiO_x/FeO_x$ alloy nanoparticles appear quite similar. However, at the white line, the peak intensity is noticeably different for the three samples, and the peak position of the edge is shifted slightly to higher eV for $FeO_x$ and $NiO_x/FeO_x$. When comparing across different sample morphologies and metal compositions, an increase in peak height can suggest an increase in order or crystallinity, while a shift to higher eV most likely suggests a larger portion of the Fe atoms are in a higher oxidation state. These results support HRTEM and XRD results, where $NiO_x/FeO_x$ and $FeO_x$—$NiO_x$ nanoparticles were both found to be more crystalline than the $NiO_x$—$NiO_x/FeO_x$ core-mixed shell nanoparticle sample.

The shift to slightly higher eV for $FeO_x$ suggests that more of the Fe atoms are likely to be in the 3+ oxidation state, rather than in the 2+ oxidation state, a conclusion that is also supported by the discussion above and the use of a $Fe^{3+}$ precursor during synthesis. Similarly, the $NiO_x/FeO_x$ alloy nanoparticle sample, also synthesized from the $Fe^{3+}$ precursor, has an edge position that is shifted slightly to higher eV, as compared to the $FeO_x$—$NiO_x$ core-shell nanoparticle sample. This result could be explained by the synthesis process in which the $FeO_x$ nanoparticles from the same synthesis were used as seeds for core-shell nanoparticle growth. Even though the $FeO_x$—$NiO_x$ core-shell nanoparticles were synthesized starting with the $FeO_x$ nanoparticles, which would suggest that that Fe K-edge position should also be shifted to higher eV and match that of the $NiO_x/FeO_x$ and $FeO_x$ samples, the edge is in fact positioned at a slightly lower eV. This result is consistent with the EELS Fe $L_{2,3}$-edge results in FIG. 7 and suggests that the Fe atoms were in a more electron-rich chemical environment in this sample. For the $NiO_x$—$NiO_x/Fe_x$ core-mixed shell nanoparticle sample, the Fe K-edge spectrum exhibited features that are quite different from that of $NiO_x/FeO_x$ alloy or $FeO_x$—$NiO_x$ core-shell nanoparticles. While not intending to be bound by theory, this result may potentially be in part because the $Fe(CO)_5$ precursor was used in place of $Fe(acac)_3$. On the other hand, the result could also be contributed from the different core-shell morphology that was formed and the presence of Ni in the iron oxide shell. The edge peak is broad and has a decreased intensity, as compared to the other samples. This result suggests a more disordered structure to the nanoparticles, as well as a population of oxidation states within the nanoparticle. By comparing with spectra of the standard samples, the Fe in this sample is likely to be a mixture of 2+/3+ state, which also agrees with the XPS results. The slightly higher intensity pre-edge suggests a distorted octahedral structure. This change in the pre-edge feature may be a result of the mixed metal oxide/hydroxide shell, where the presence of both metals in an oxide/hydroxide phase would likely cause distortions in the coordination chemistry of the Fe.

The pre-edge features of all three samples are quite similar in shape and position and align most closely with the $NiFe_2O_4$ pre-edge position, albeit with a lower pre-edge intensity. The lower pre-edge intensity suggests an octahedral coordination environment, and the lower pre-edge intensity combined with the lower eV edge position suggest an iron phase that has Fe(II) and Fe(III) species. While the edge is not shifted fully to the lower eV position of the $Fe_3O_4$ reference material, the slight shift is suggestive of some of the Fe atoms having a lower oxidation state, similar to that of a $Fe_3O_4$-like phase, perhaps in combination with a $Fe_2O_3$-like phase. The minor shift suggests a small contribution of more electron-rich Fe atoms to the overall ensemble of Fe in the nanoparticles.

The EXAFS region suggests slight differences in Fe—O bond length in the first coordination sphere amongst the experimental samples, along with a shoulder around 1 Å, which is indicative of a contribution from iron hydroxide and similar to EXAFS spectra obtained for the Fe K edge of other $Fe_xNi_y(OH)_z$ materials. All experimental samples appear to have an Fe—O bond length that is slightly larger than the most relevant reference material, $Fe_3O_4$, and the $NiO_x$—$NiO_x/FeO_x$ core-mixed shell nanoparticle sample resulted in a slightly larger bond length than the other experimental samples. The second coordination sphere metal-metal distances (Fe—O—Fe/Ni) also vary as a function of the different experimental samples and as compared to the reference materials. Generally, there appears to be more variability in the second coordination sphere than in the first coordination sphere, which may result from the influences of Fe—Ni substitution and phase structural differences as a result of the different morphologies synthesized in nanoparticle form. The broad peak obtained for core-shell $FeO_x$—$NiO_x$ is suggestive of the $Fe_3O_4$ reference material spectra, with less well-defined peak separation within the second coordination sphere; this peak splitting is caused by the multiple chemical environments of the Fe atoms, and thus multiple Fe—O—Fe metal-metal distances, in the $Fe_3O_4$ crystal structure, nominally described as an Fe(II)/Fe(III) mixed oxidation state material. The peak of the second coordination sphere for $FeO_x$ vs $NiO_x/FeO_x$ is less broad and is positioned at shorter vs longer radial distance, respectively. The peak of the second coordination sphere for the core-mixed shell $NiO_x$—$NiO_x/Fe_x$ has significantly lower peak intensity, suggesting structural disorder. The peak is also more narrow than those of the other experimental samples and is located at lower radial distance, as compared to $NiO_x/FeO_x$; lower radial distance is suggestive of a compressed Fe—O—M metal-metal bond distance.

Figure 6:
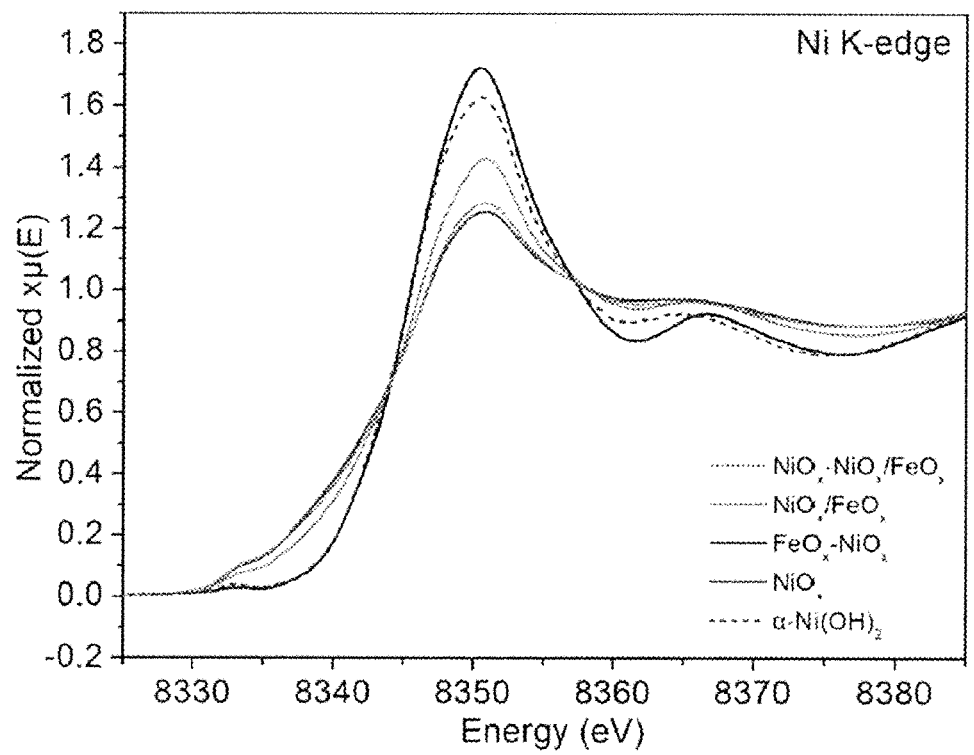
FIG. 6 is a graphical representation of XAS spectra of Ni K-edge for different nanoparticles.

The spectra for Ni are plotted in FIG. 6. The spectral shapes of the Ni K-edge for the $NiO_x$—$NiO_x/Fe_x$ core-mixed shell nanoparticles and the $NiO_x$ nanoparticles had nearly identical features in both the pre-edge and the white line edge. This result clearly indicates that the majority of the Ni atoms in the $NiO_x$—$NiO_x/Fe_x$ core-mixed shell nanoparticles were in a chemical environment like that of the $NiO_x$ nanoparticles, which is likely to be $\alpha$-$Ni(OH)_2$, based on the XRD results. The $NiO_x/FeO_x$ alloy nanoparticles resulted in a pre-edge shape and intensity that was quite similar to the $NiO_x$ and $NiO_x$—$NiO_x/FeO_x$ nanoparticles. All three samples have a pre-edge intensity that is higher than that of the $\alpha$-$Ni(OH)_2$ reference material, suggesting that the Ni species of these three samples are in a distorted octahedral coordination geometry, rather than the octahedral geometry expected for $\alpha$-$Ni(OH)_2$. In contrast, the pre-edge of the $FeO_x$—$NiO_x$ core-shell nanoparticles matches the shape and intensity of $\alpha$-$Ni(OH)_2$, suggesting the Ni atoms are in an octahedral coordination environment typical of the alpha hydroxide phase. This conclusion is further supported by the similar white line edge position and peak intensity of the $FeO_x$—$NiO_x$ core-shell nanoparticles, as compared to the $\alpha$-$Ni(OH)_2$ reference material. Across the set of experimental samples, all of the samples displayed an edge position indicative of $\alpha$-$Ni(OH)_2$, and thus, the Ni was likely in 2+ state.

Similar to the results for the Fe K edge, the EXAFS region suggests slight shifts in Ni—O first coordination sphere bond distances. However, the variability observed in the Fe EXAFS region for the second coordination sphere is not apparent in the Ni EXAFS region for the Ni second coordination sphere (Ni—O—Ni/Fe). This result may suggest that some of the differences observed in nanoparticle structure and, ultimately, electrochemical performance, are a result of differences in the chemical coordination environment of the Fe, more so than the Ni, species in these nanoparticle materials. The shape and peak position of the second coordination sphere is quite similar to that of the $\alpha$-$Ni(OH)_2$ reference material for all of the experimental samples.

EXAMPLE 4

Electron Energy Loss (EELS) Spectroscopy of Ni-Fe-Based Nanocatalysts

Figure 7A:
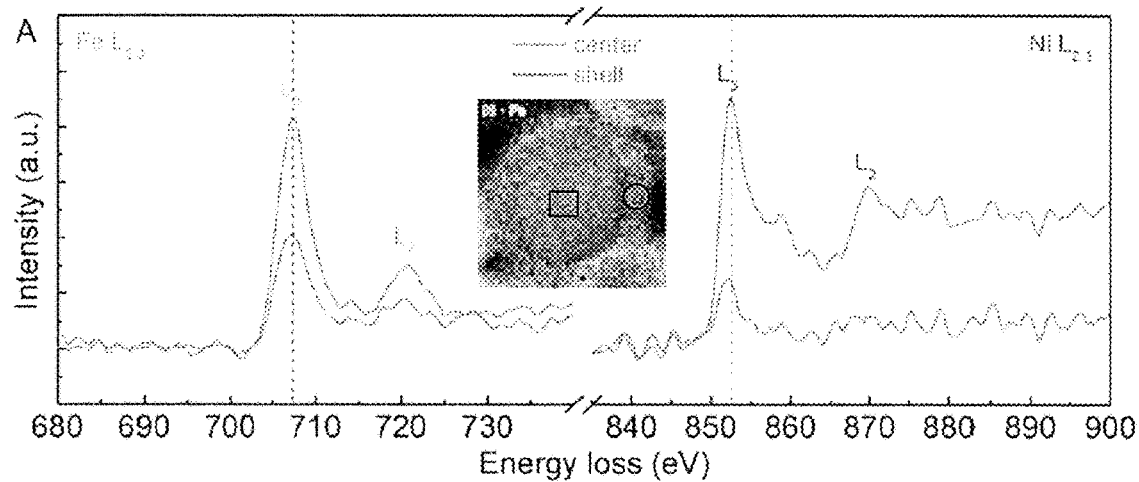
FIG. 7A is EELS spectra of Ni and Fe $L_{2,3}$-edges extracted from the center region (square) and the shell region (circle) of $NiO_x$—$NiO_x/Fe_x$ core-mixed shell nanoparticle displayed in the panel.
Figure 7B:
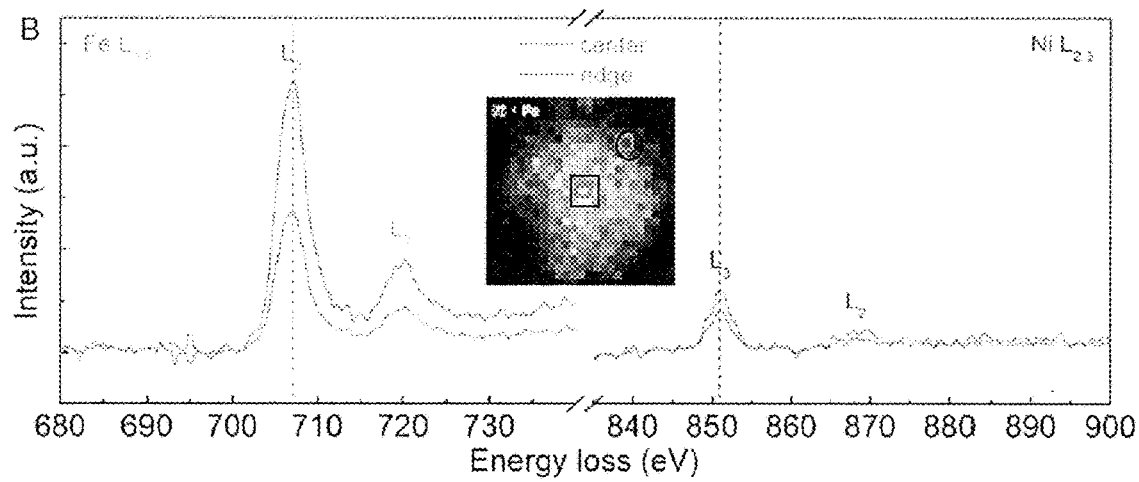
FIG. 7B is EELS spectra of Ni and Fe $L_{2,3}$-edges extracted from the center region (square) and the shell region (circle) of $NiO_x/FeO_x$ alloy nanoparticle displayed in the panel.
Figure 7C:
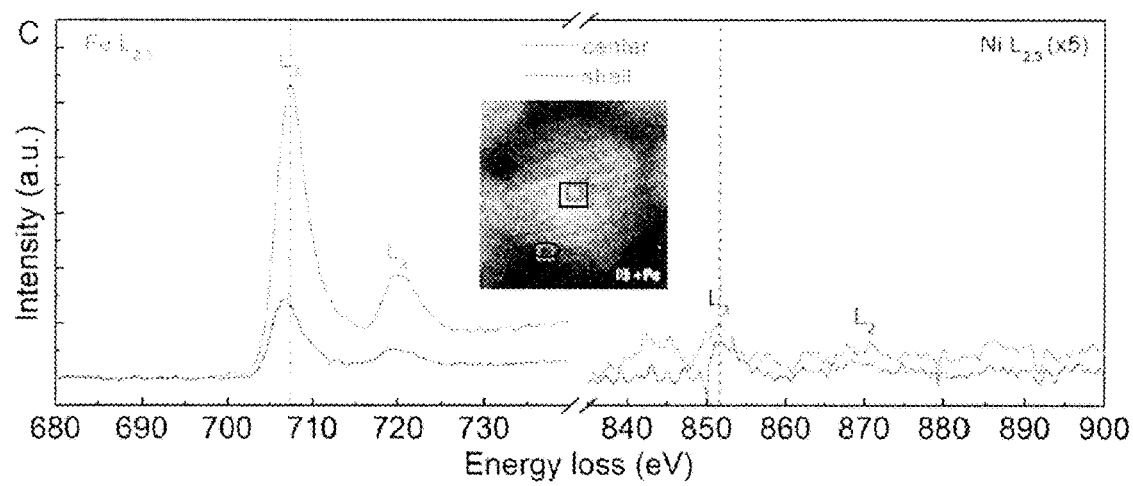
FIG. 7C is EELS spectra of Ni and Fe $L_{2,3}$-edges extracted from the center region (square) and the shell region (circle) of $FeO_x$—$NiO_x$ core-shell nanoparticle displayed in the panel.

Further analysis of EELS data from individual nanoparticles reveals the differences in local chemical states of Fe and Ni between the core and the shell in the core-shell structures and provides results that correspond well with XAS data on the bulk samples. FIG. 7 displays the EELS spectra of the Ni and Fe $L_{2,3}$-edges extracted from the center and the edge of the core-shell nanoparticles (i.e., $NiO_x$—$NiO_x/Fe_x$ core-mixed shell and $FeO_x$—$NiO_x$ core-shell) and the $NiO_x/FeO_x$ alloy nanoparticle. No peak shifts for both the Fe and Ni $L_{2,3}$-edges were found for the alloy nanoparticles, suggesting the uniform chemical environment of both Fe and Ni across the nanoparticle, but shifts of the peak positions were observed in the EELS spectra for the core-shell structures. Based on the shift of the energy onset, the relative oxidation state, coordination environment, and electron density of elements in the center and the shell can be compared. The lower energy onset can correspond to a lower oxidation state or an electron rich state of the element due to the screening effect of outer-shell electrons. For Fe, a shift to lower energy onset may also suggest a shift in coordination from octahedral to tetrahedral. The direct comparison of the core and shell energy onset, however, is not straightforward because TEM is a 2-D projection of an object and thus each center spectrum contains the information of both the core and shell. Nonetheless, comparing the center and shell spectra, the energy shifts could provide evidence for local chemical environment changes of elements.

For $NiO_x$—$NiO_x/Fe_x$ core-mixed shell nanoparticles, the energy positions of the Fe $L_{2,3}$-edges in the center and shell spectra are essentially the same because there is no Fe in the core and both spectra indicate the Fe in the shell. For Ni, however, the energy onset of the $L_3$ edge in the shell is 0.5 eV lower than that in the center. Although the center spectrum contains the Ni signal from both the core and the shell, most of the Ni signal is contributed from the pure Ni core because the shell is very thin, with a thickness that is 1/8th of the core diameter, and is composed of a mixture of Ni and Fe at an atomic ratio of 0.39/1. Prior work has shown that a shift to lower eV can be due to the presence of nickel metal rather than nickel oxide. However, research has also shown that when metal atoms are incorporated into a nanostructured material, $L_{2,3}$ edge shifts may also occur and are thought, generally, to result from shifts in bi-metallic influences on coordination and spin state. It is unlikely that the Ni atoms in the shell of these nanoparticles experienced a full oxidation state change from $Ni^{2+}$ to $Ni^0$; however, the Fe atoms present in the shell can contribute electron density to the Ni atoms. Thus, in some instances, the onset energy shift of the Ni in the shell as likely due to the contributions of electron transfer from surrounding Fe in the shell, which provide electron-rich Ni on the surface of the $NiO_x$—$NiO_x/Fe_x$ core-mixed shell nanoparticles. This shift could also be a result of the strain effects; however, further analysis of the crystal structure difference at the core-shell interface is needed in order to determine the strain states. Additional evidence for the proposed electron transfer or electron donation from Fe to Ni is supported by the Fe K edge EXAFS, where the smaller radial distance of the second coordination sphere suggests a compressed Fe—O—M bond distance and loss of electron density. The binding energy of Fe 2p electrons for $NiO_x$—$NiO_x/Fe_x$ increased by 0.8 eV compared to that for $FeO_x$ while the binding energy of Ni 2p electrons for $NiO_x$—$NiO_x/FeO_x$ decreased by 0.2 eV compared to that for $NiO_x$. These corroborative results suggest that electrons are preferentially transferred or donated from Fe to Ni in the shell of the $NiO_x$—$NiO_x/FeO_x$ core-mixed shell nanostructures.

In contrast, for the $FeO_x$—$NiO_x$ core-shell nanoparticles, no difference was observed in the peak position of the Ni $L_3$-edge in EELS spectra while a 0.5 eV shift to lower energy for the peak position of the Fe $L_3$-edge was observed in the shell spectrum compared to the center spectrum. The shift to lower energy suggests the presence of Fe(II) species, which is supported by our previous analysis of the Fe K-edge spectra. This energy onset decrease in eV for the Fe at the interface of the core-shell nanoparticles could be attributed to the deposition of metallic Ni from the thermal decomposition of the Ni(0) organometallic complex thermal deposition, leading to an electron-rich environment for the surface Fe. The XPS data also indicates that Ni is more electron-rich in $FeO_x$—$NiO_x$ core-shell nanoparticles than in $NiO_x$ nanoparticles, which is likely due to the use of precursors with different valence ($Ni_0$ versus $Ni_{2+}$) in the corresponding synthesis. This result is consistent with XAS results that the Fe K edge of $FeO_x$—$NiO_x$ core-shell is in fact positioned at a lower eV compared to $FeO_x$.

EXAMPLE 5

Electrochemical Evaluation of Ni-Fe-Based Nanocatalysts

Figure 8:
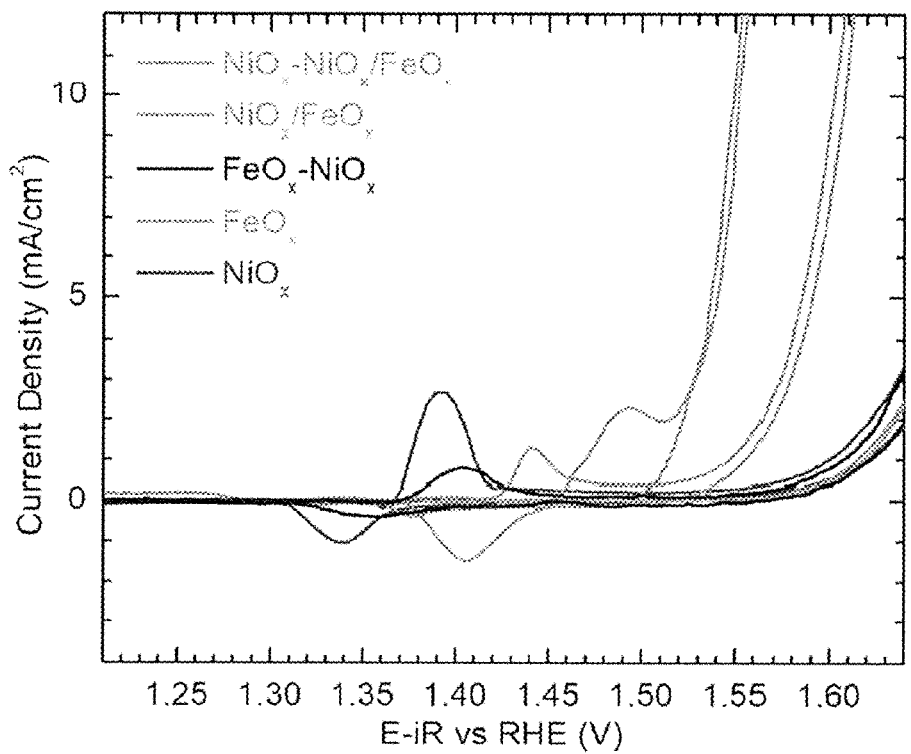
FIG. 8 is a cyclic voltammetry (CV) graph of CV profiles of different nanoparticles.

The three different morphologies of Ni—Fe based nanostructures (i.e., $NiO_x$—$NiO_x/FeO_x$ core-mixed shell, $NiO_x$—$FeO_x$ alloy, and $FeO_x$—$NiO_x$ core-shell) along with the controls (i.e., $NiO_x$ and $FeO_x$) were evaluated for OER. The OER activity of the nanoparticles was assessed by their cyclic voltammetry (CV) profile in 1 M KOH. FIG. 8 shows the CV profile comparison of these nanocatalysts. The $NiO_x$—$NiO_x/Fe_x$ core-mixed shell nanoparticles exhibited the best performance with the lowest onset potential, which reached the benchmark current density of 10 mA/cm² at 1.55 V vs RHE. The $NiO_x$—$FeO_x$ alloy nanoparticles had the second lowest onset potential and reached 10 mA/cm² at 1.60 V vs RHE. The remaining nanocatalysts were rather poor OER electrocatalysts, showing much higher onset potentials. The two bimetallic nanocatalysts (i.e., $NiO_x$—$NiO_x/Fe_x$ core-mixed shell and $NiO_x/FeO_x$ alloy) drastically outperformed the two monometallic nanocatalysts (i.e. $NiO_x$ or $FeO_x$ alone), which agrees with the literature reported on the thin film studies. Another bimetallic nanocatalyst ($FeO_x$—$NiO_x$ core-shell) did not improve the onset potential compared to $NiO_x$ or $FeO_x$, suggesting that the 3-D morphology has a significant influence on the electrocatalytic activity of the NiFe-based nanocatalysts. This result is also likely driven by the composition of the iron and nickel at the surface of the nanoparticles, where the atomic composition of Ni in the $FeO_x$—$NiO_x$ core-shell nanoparticles was quite low (7.2%). In some instances, an Fe/Ni atomic ratio in the range of 20-80, 25-75, 30-70, 35-65, 40-60, 45-55, or 50-50 is the most active for OER. Interestingly, the $NiO_x/FeO_x$ alloy nanoparticles fit this parameter range, but the $NiO_x$—$NiO_x/Fe_x$ core-mixed shell nanoparticles do not fit this expectation, based on compositional analysis from EELS. Thus, the OER activity of the $NiO_x$—$NiO_x/Fe_x$ nanoparticles is attributed to the modified electronic structure of the Fe and Ni atoms in the mixed metal shell, where it appears from EELS and XPS analysis that the Ni atoms are more electron rich, while the Fe atoms likely are donating electrons to the Ni atoms.

The difference in 3-D morphology of these nanocatalysts also impacts the characteristic Ni redox peak in the CV profiles. The $NiO_x$ nanoparticles exhibited the largest area for the Ni redox peaks, which occurred at the lowest potential among all the nanocatalysts. As can be seen from the CV data, the height of the Ni redox peak does not necessarily correlate directly with OER activity; $NiO_x$ alone is expected to have a distinct redox peak but low OER activity in purified alkaline electrolyte, as there are no Fe atoms present to enhance the OER reaction. The $FeO_x$—$NiO_x$ core-shell nanocatalyst has a small characteristic Ni redox peak despite the presence of Ni; this small peak is likely an indication of the low Ni content in these core-shell nanoparticles. $NiO_x/FeO_x$ alloy nanoparticles had the second largest area for the Ni redox peak and a slight shift to higher voltage of the potential compared to $NiO_x$ nanoparticles. Unlike $NiO_x$ and $NiO_x/FeO_x$ alloy nanoparticles, the $NiO_x$—$NiO_x/Fe_x$ core-mixed shell nanoparticles had the highest voltage onset for the Ni redox peak, immediately before the onset potential of OER. The overall trend for the change of the characteristic Ni redox peaks agrees with previous studies, which concluded that incorporation of Fe in $NiO_x$ thin films increases the Ni redox potential and decreases the area of the Ni redox peaks. Further analysis was performed to calculate the turnover frequency (TOF) based on the quantitative Ni in the samples, where the amount of Ni was estimated based on either the ICP-MS results or the integration of the redox wave (i.e., anodic wave) for each of the nanocatalysts. For TOFICP-MS, the $NiO_x$—$NiO_x/Fe_x$ core-mixed shell had the highest value of 1.175 s$^{-1}$, followed by $NiO_x/FeO_x$ alloy with a value of 0.090 s–1. The TOFICP-MS values for $NiO_x$ and $FeO_x$—$NiO_x$ were 60-80 times lower at 0.006 s–1 and 0.003 s–1, respectively. The $TOF_{redox\ wave}$ was also calculated with the assumptions of either 1 electron or 1.5 electron transfer per Ni atom. The $TOF_{redox\ wave}$ values for all of the nanocatalysts were 2-5 times higher than those of the corresponding TOFICP-MS; however, the trend of both TOF values appeared to be the same in order of decreasing activity, with $NiO_x$—$NiO_x/Fe_x$ core-mixed shell >$NiO_x/FeO_x$ alloy >$NiO_x$ ~$FeO_x$—$NiO_x$. The TOF values agreed well with the OER activity assessed based on the onset potential of the benchmark current density of 10 mA/cm².

Figure 9:
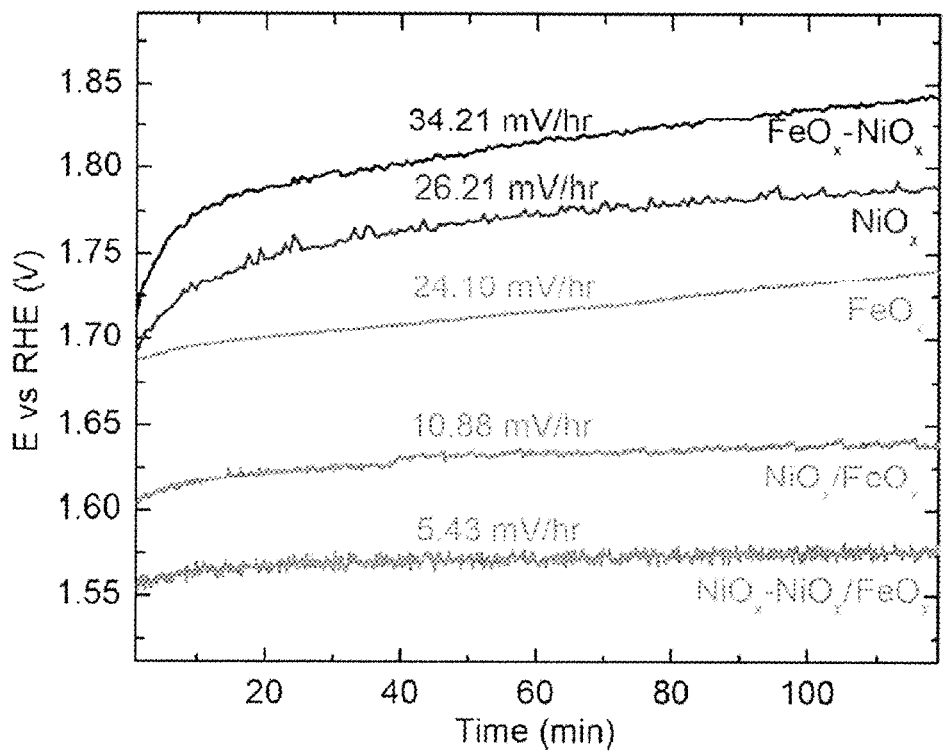
FIG. 9 is a chronopotentiometry (CP) graph of different nanoparticles.

In addition to the electrocatalytic activity, the stability of the nanocatalysts was measured by chronopotentiometry (CP) for 2 h in 1 M KOH, as shown in FIG. 9. The degradation rate was calculated by taking the slope of potential over time for each curve corresponding to each nanocatalyst. The $NiO_x$—$NiO_x/Fe_x$ core-mixed shell nanoparticles had the lowest degradation rate of 5.4 mV/h, followed by $NiO_x/FeO_x$ alloy nanoparticles at a rate of 10.9 mV/h. The $FeO_x$, $NiO_x$, and $FeO_x$—$NiO_x$ had faster degradation rates at 24.1, 26.2, and 34.2 mV/h, respectively. The most active nanocatalyst (i.e. $NiO_x$—$NiO_x/FeO_x$ core-mixed shell nanoparticles) was found to be the most stable electrocatalyst in this series. The $NiO_x/FeO_x$ alloy was the second best electrocatalyst based on the assessment of both activity and stability. The $NiO_x/FeO_x$ alloy nanoparticles had a mixed molar composition of ~0.8:1 (Ni:Fe) while the $NiO_x$—$NiO_x/Fe_x$ core-mixed shell nanoparticles contained a pure $NiO_x$ core and ~0.4:1 (Ni:Fe) mixed alloy shell, but the $FeO_x$—$NiO_x$ core-shell appeared to be a pure $NiO_x$ cluster shell (i.e., without any Fe included in the $NiO_x$ structure). Surprisingly, the $NiO_x$—$NiO_x/Fe_x$ core-mixed shell nanoparticles, with half the amount of Ni in the shell compared to the $NiO_x/FeO_x$ alloy nanoparticles, out-performed the $NiO_x/FeO_x$ alloy nanoparticles in both activity and stability. These results suggest that the mixed $NiO_x/FeO_x$ alloy composition contributes to high electrocatalytic activity for OER and the 3-D morphology plays a key role in optimization of the electrocatalytic activity and stability of the nanocatalyst for OER.

EXAMPLE 6

Synthesis of $NiO_x$—$NiO_x/FeO_x$ Core-Mixed Shell Nanoparticles

The Ni—Fe core-shell nanoparticles were synthesized by a two-step procedure involving the synthesis of Ni core and following by coating the Ni core with Fe shell. In a typical synthesis, $Ni(acac)_2$ (51.5 mg, 0.2 mmol), 4 mL of octadecene (ODE), and 1 mL of oleylamine (OLAM) were added to a 3-neck, round bottom flask equipped with a condenser and a Schlenk line system. This reaction mixture was degassed for 10 min before 1 mL of trioctylphosphine (TOP) was added to the reaction. Under the protection of argon, the reaction was heated to 220° C. within 10 min and was held at 220° C. for additional 20 min to allow the formation of Ni cores. The reaction was quenched by removing the flask from the heating mantle. After the reaction mixture was cooled to 50° C., the product was transferred to a 50 mL centrifuge tube filled with 5 mL toluene and 20 mL of ethanol which was centrifuged at 8000 rcf for 5 min to remove excess reactants. The nanoparticle pellet was dispersed and purified using a mixture of 1:4 toluene and ethanol. The nanoparticles were dispersed in 6 mL of toluene.

For the Fe shelling procedure, 1.8 mL of the above Ni nanoparticles (~5 mg) was dried under a stream of argon in a 3-neck, round-bottom flask. Then, 200 µL of OLAM and 5 mL of ODE were added to the flask and the nanoparticles were dispersed in the mixture via sonication. To ensure a uniform coating, the reaction temperature was ramped using a step-wise procedure during the addition of Fe precursor. The temperature was first ramped to 100° C. prior to the degassing of the reaction mixture. The temperature was then continued to ramp to 110° C. and held for 10 min. Then, $Fe(CO)_5$ (20 µL, 0.15 mmol) was injected into the reaction using a gas-tight syringe. After adding the Fe precursor, the temperature was increased at a rate of 2.5° C./min until 200° C. and the reaction was held at 200° C. for 60 min. After the reaction was quenched and cooled to 50° C., the product was transferred to a 50 mL centrifuge tube filled with ethanol to 30 mL which was centrifuged at 8000 rcf for 5 min to remove excess reactants. The nanoparticle pellet was dispersed and purified using a mixture of 2:1 toluene and ethanol and collected by centrifuging at 2000 rcf for 10 min. The nanoparticles were dispersed in 2 mL of toluene.

EXAMPLE 7

Synthesis of Ni—Fe Alloyed Nanoparticles

Similar procedure was applied to the synthesis of alloyed nanoparticles as that for the Ni core synthesis except equimolar amounts of $Ni(acac)_2$ (25.7 mg, 0.1 mmol) and $Fe(acac)_3$ (26.5 mg, 0.1 mmol) were used in the reaction.

EXAMPLE 8

Synthesis of Fe—Ni Core-Shell Nanoparticle

The Fe—Ni core-shell nanoparticles were synthesized by a two-step procedure involving the synthesis of Fe core and following by coating the Fe core with Fe shell. The same reaction set up and heating procedure were used as that for the Ni—Fe core-shell unless specified. In a typical synthesis, $Fe(acac)_2$ (530.0 mg, 1.5 mmol), 4 mL of 0.5 mL of dibenzyl ether (DBE), and 7.5 mL of oleylamine (OLAM) were used in the reaction. After degassing, the reaction was heated to 280° C. and held at 280° C. for 60 min. The product was distributed in equal volume into two 50 mL centrifuge tubes filled with ethanol to 30 mL which was centrifuged at 2000 rcf for 10 min to remove excess reactants. The nanoparticle pellet was dispersed and purified using a mixture of 1:10 toluene and ethanol twice and collected by centrifuging at 8000 rcf for 5 min. The nanoparticles were dispersed in 6 mL of toluene.

For the Ni shelling procedure, 200 µL of the above Fe nanoparticles (~5 mg) was dried under a stream of argon in a 3-neck, round-bottom flask. Then, 200 µL of OLAM and 5 mL of ODE were added to the flask and the nanoparticles were dispersed in the mixture via sonication. After degassing, Ni-COD (40.0 mg, 0.15 mmol) added in 2 mL of DBE was injected into the reaction. The reaction temperature was increased at a rate of 2.5° C./min to 200° C. and held at 200° C. for 60 min. The product was transferred to a 50 mL centrifuge tube filled with ethanol to 30 mL which was centrifuged at 8000 rcf for 5 min to remove excess reactants. The nanoparticle pellet was dispersed and purified using ethanol and collected by centrifuging at 12500 ref for 10 min. The nanoparticles were dispersed in 2 mL of toluene.

EXAMPLE 9

Nanoparticle Surface Ligand Exchange

The nanoparticles dispersed in toluene were transferred into aqueous dispersion by surface ligand exchange process using methoxypolyethylene glycol carboxylic acid (PEG-COOH, M.W.=5000). In a typical procedure, 2 mL of the nanoparticle suspension in toluene was added to 10 mL of 1 mg/mL PEG-COOH chloroform solution in a 20 mL scintillation vial. The reaction mixture was capped and stirred overnight. The product was distributed in two 50 mL centrifuge tubes which were filled to 45 mL with hexane and centrifuged at 15,000 rcf for 10 min. The resulting pellet was purified with ethanol/water and collected by centrifuging at 20,000 rcf for 30 min at 4° C. The final product was dispersed in 500 µL of ethanol/water for quantification and characterization.

Low resolution TEM images were captured using a JEOL JEM-1011 microscope with an accelerating voltage of 100 kV. HAADF-STEM images were acquired using the JEM-ARM200F microscope equipped with cold field emission gun and double aberration correctors at the accelerating voltage of 200 kV. The inner and outer collection angles for HAADF images were 67 and 275 mrad, respectively. The spatial resolution of HAADF images was 0.8 Å. The 2D EELS mapping of Fe L-edge and Ni L-edge was carried out using a Gatan energy-loss spectrometer at an accelerating voltage of 200 kV and a beam convergence semi-angle of 21.2 mrad. Dispersion of 0.25 eV/channel was used to simultaneously acquire Fe L-edge and Ni L-edge, as well as O K-edge. The dual-EELS mode was adopted for the convenience of correcting zero-loss. The mass concentrations of Ni and Fe were determined using a Thermo Scientific iCAP Q ICP-MS. XRD patterns were collected on Rigaku Ultima III X-ray diffractometer in a parallel beam geometry. Copper anode x-ray tube was used as a radiation source and diffracted beam monochromator was employed to remove fluorescence background. Samples were deposited on a zero diffraction Silicon plates (MTI Corp., CA) and data was collected at 0.07 degrees per minute scan rates in two theta range from 20 to 80 degrees with 0.1 step. The XPS experiments were carried out in an ultrahigh vacuum (UHV) system with base pressures <5×10−9 Torr equipped a hemispherical electron energy analyzer (SPECS, PHOIBOS 100) and twin anode X-ray source (SPECS, XR50). Mg K$\alpha$ (1253.6 eV) radiation was used at 15 kV and 20 mA. The angle between the analyzer and X-ray source is 45° and photoelectrons were collected along the sample surface normal. The XPS spectra was analyzed and deconvoluted using Casa XPS software.

The XAS of the samples and the standards were performed at Argonne National Laboratory (APS 12-BM-B). The standards were purchased from commercial vendors. Standards included nickel foil, nickel oxide, alpha and beta nickel hydroxide, alpha and gamma nickel oxyhydroxide, iron foil, iron oxides (FeO, $Fe_2O_3$, and $Fe_3O_4$), iron hydroxide, and iron nickel oxide. Samples and standards were deposited onto the Kapton tape and were sealed on top by a layer of Kapton tape. Along with the standards and the samples, metal reference foils for iron and nickel were also ran simultaneously. The data analysis was done through Athena software. All the standards and the samples were calibrated to the respective metal reference foils. The measurements were performed at room temperature in transmission mode (or fluorescence mode with a 13 elements Ge detector). The samples were scanned at the K-edge of Fe (7112 eV) (150 eV below to 800 eV above) and Ni (8333 eV).

The CV and CP were performed on a Pine WaveNow 50 potentiostat using a 3-electrode cell setup. In this setup, Au electrode (BASi®) was used to prepare the working electrode while a graphite rod was used as the counter electrode and Ag/AgCl (kept inside a salt bridge containing 3 M NaCl solution) was used as the reference electrode. In all experiments, 1 M KOH was used as the electrolyte solution. Argon gas was continuously bubbled throughout the experiments to remove oxygen formed in the solution.

Catalyst inks were prepared by mixing the nanoparticles with a cationic ionomer at a ratio of 6:1 (g Fe: g ionomer) in ethanol. The ink was subsequently sonicated for 15 min to mix the nanoparticles and the ionomer homogeneously. Approximately 1 μl of the ink was deposited onto the electrode surface (0.02 cm2) using the dropcast method and was allowed to dry in air. CV was run at a scan rate of 10 mV/s between 0 V to 0.8 V vs Ag/AgCl. The data at $21^{st}$ cycle was reported. CP was conducted for 2 h at a current density of 10 mA/cm2. Potential in reference to Ag/AgCl was converted into RHE by using the following equation: ERHE=EAg/AgCl+0.059·pH+E0Ag/AgCl, where pH is 14 because the measurement was performed in 1 M KOH; E0Ag/AgCl is 0.21 V for the reference electrode of Ag/AgCl in 3 M NaCl. The iRu correction was applied to the CV curves obtained from the measurement where i stands for the measured current in unit ampere and Ru is the value of uncompensated resistance. Ru was measured using potentiostatic electrochemical impendance spectroscopy and the Ru values were taken at a frequency of 100 KHz. Calculation for overpotential was done by subtracting the theoretical potential for OER, 1.23 V, from the measured potential vs. RHE. To calculate the current density (j, mA/cm$^2$), current is normalized to geometric surface area of the Au electrode (0.02 cm$^2$). Chronopotentiometry was conducted for 2 h at a current density of 10 mA/cm$^2$.

EXAMPLE 10

Surface Ligands and Core-Shell Nanoparticle Catalytic Activity $NiO_x$—$NiO_x/FeO_x$ core-mixed shell nanoparticles were modified with eight (8) different ligands to enhance dispersion the composite core-shell nanoparticles in aqueous and/or aqueous basic media. The ligands included polyethylene glycol with carboxylic acid or amine terminus (PEG-COOH or PEG-NH$_2$, M.W.=5000), 3-(3,4-dihydroxypheny)propionic acid (DOP-CCOH), dopamine, L-3,4-dihydroxyphenylalanine (L-DOPA), homovanillic acid, 3,4-dihydroxyphenylacitic acid (DHPAA), and 3-O-methyl dopamine.

Figure 11A:
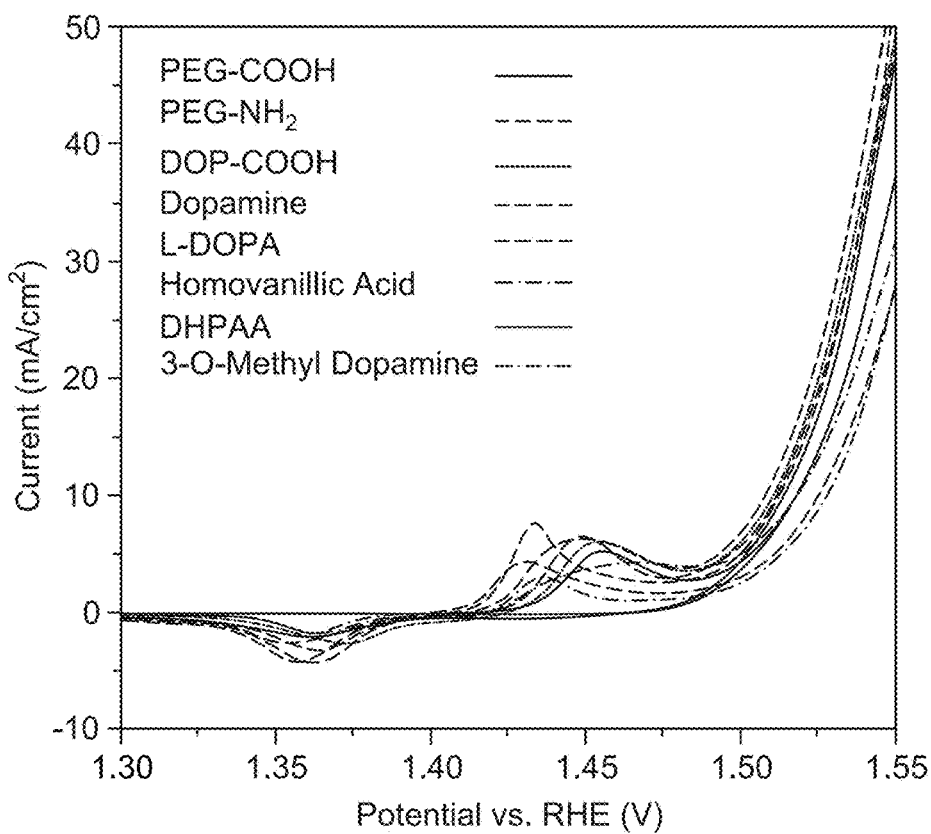
FIG. 11A provides CV curves of core-shell nanoparticle catalysts with different surface ligands.
Figure 11B:
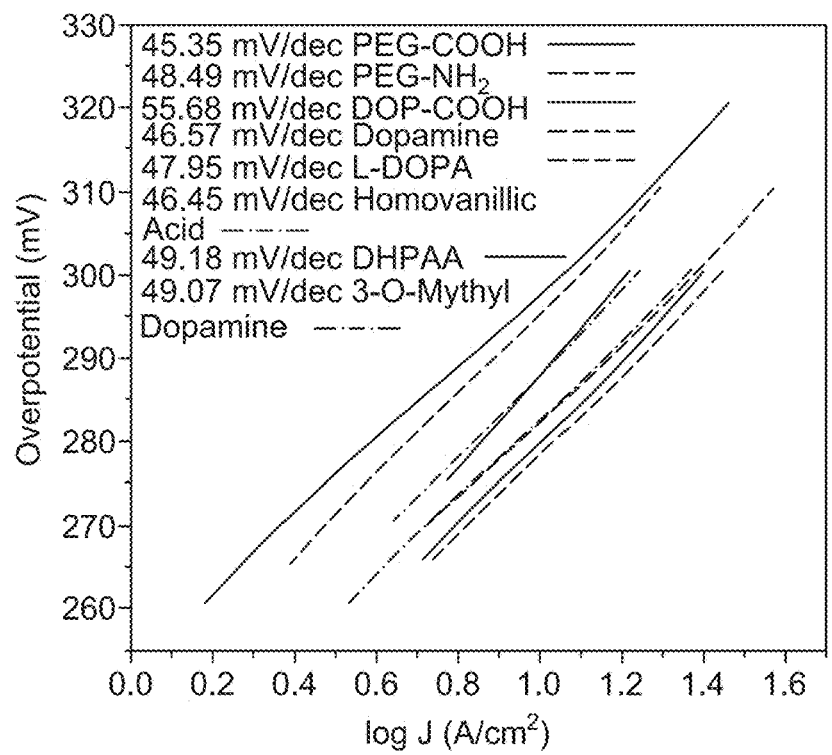
FIG. 11B provides Tafel plots of the overpotential against log of the current density.

The corresponding catalytic activity of the surface modified core-mixed shell nanoparticles was evaluated by the cyclic voltammetry (CV) and the Tafel plot as shown in FIG. 11. The analysis of overpotentials and the Tafel plot slopes were listed in Table 2. Different ligands have some effects, but not significant on the catalytic activity of oxygen evolution reaction (OER) on the core-shell nanoparticle catalyst.

TABLE 2

| Ligand | Tafel slope (mV/dec) | η (mV) at 10 mA/cm$^2$ | η (mV) at 50 mA/cm$^2$ | η (mV) at 100 mA/cm$^2$ |
| --- | --- | --- | --- | --- |
| PEG-COOH | 45.35 | 298 | 336 | 361 |
| PEG-NH$_2$ | 48.49 | 295 | 337 | 364 |
| DOP-COOH | 55.68 | 289 | 337 | 371 |
| dopamine | 46.57 | 292 | 319 | 343 |
| L-DOPA | 47.95 | 279 | 318 | 344 |
| Homovanillic acid | 46.45 | 284 | 322 | 348 |
| DHPAA | 49.18 | 281 | 321 | 349 |
| 3-O-methy dopamine | 49.07 | 295 | 332 | 361 |

EXAMPLE 11

Core-Shell Nanoparticle Catalysts on Differing Electrode Substrates

Figure 12A:
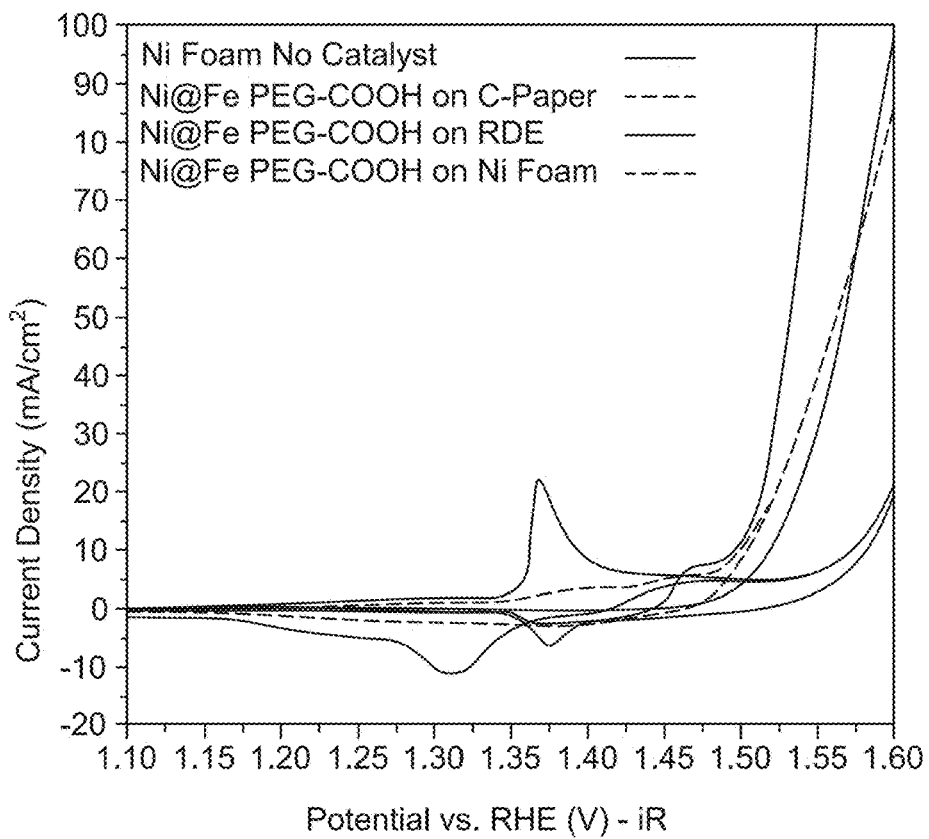
FIG. 12A provides CV curves of core-shell nanoparticle catalysts on differing electrode substrates.
Figure 12B:
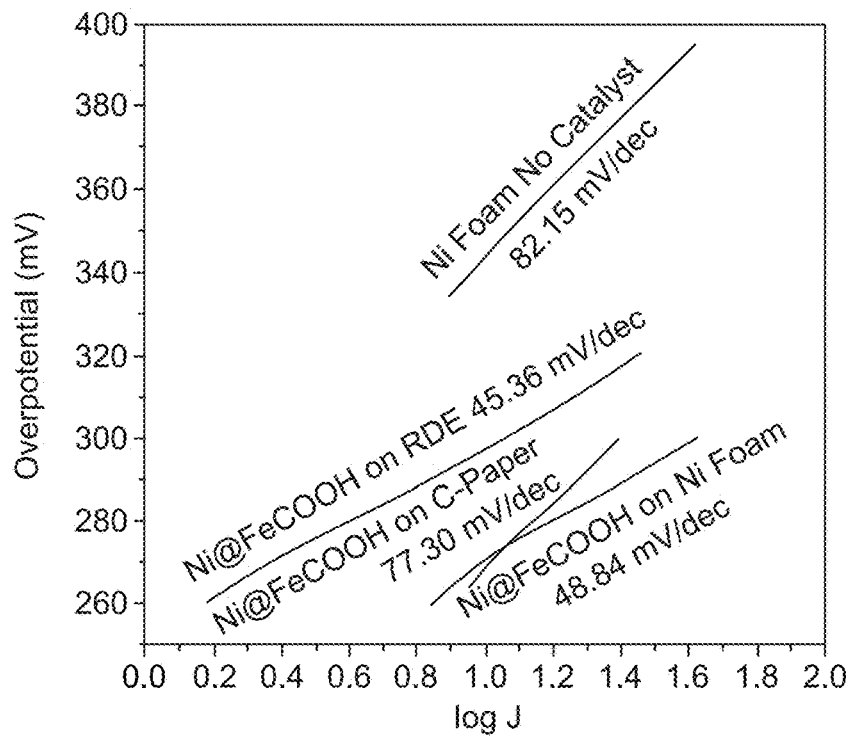
FIG. 12B provides Tafel plots of the overpotential against log of the current density.

The OER electrocatalytic activity of PEG-COOH modified $NiO_x$—$NiO_x/Fe_x$ core-shell catalysts was tested for different substrates, including glassy carbon electrode (RDE), carbon paper (C-paper), and Ni foam, as shown in FIG. 12. The electrocatalysts exhibited the highest activity on Ni foam relative to the other substrates, significantly lowing the overpotentials at higher current densities that would potentially benefit the industrial use in the electrolyzer application.

As described herein, various embodiments of scalable, oil-based synthesis based on thermal decomposition of organometallic complexes are disclosed that can manipulate both the morphology and crystalline phase of the Ni-Fe-based nanocatalysts. Highly uniform Ni-Fe-based nanostructures with different morphologies (i.e., Ni—Fe core-shell, Ni/Fe alloy, and Fe—Ni core-shell) were synthesized via either sequential or simultaneous injection. TEM imaging revealed that the Ni—Fe core-shell is more complex due to the diffusion of Ni into the Fe shell, while the Ni—Fe alloy nanoparticle structure appeared to be a homogeneous mixture and the Fe—Ni core-shell structure contained an $FeO_x$ core with $NiO_x$ islands/thin shell. Coupled with x-ray characterization methods on the bulk and surface of the sample, the morphology, composition, and structure of individual particles for each of these nanostructures to be $NiO_x$—$NiO_x$/$Fe_x$ core-mixed shell, $NiO_x$/$FeO_x$ alloy, and $FeO_x$—$NiO_x$ core-shell structures has been described.

The overpotentials of these nanocatalysts increased in the order of $NiO_x$—$NiO_x$/$Fe_x$ core-mixed shell <$NiO_x$/$FeO_x$ alloy <$FeO_x$—$NiO_x$ core-shell structures ≈$NiO_x$≈$FeO_x$. The TOF values obtained based on both ICP-MS and redox wave followed the same trend. These results suggested that the crystalline $FeO_x$ core did not promote the catalytic activity of $NiO_x$ in the $FeO_x$—$NiO_x$ core-shell morphology, possibly due to the high crystallinity of $FeO_x$, which prevented Fe diffusion into the $NiO_x$ shell. In contrast, the amorphous, disordered nature of the $NiO_x$ core, which appears to be most similar to $\alpha$-$Ni(OH)_2$, allowed the diffusion of Ni into the $FeO_x$ for the $NiO_x$—$NiO_x$/$Fe_x$ core-mixed shell nanoparticles. The resultant mixed metal hydroxide/oxide shell on $\alpha$-$Ni(OH)_2$ core enabled the most active and stable nanocatalyst, which out-performed the comparison $NiO_x$/$FeO_x$ alloy nanoparticles with a 1:1 composition expected to be active for OER. These findings highlight that 3-D morphology, including the changes in crystallinity, phase, and chemical environment of both metal species, can significantly affect the electrocatalytic activity and stability of nanocatalysts for alkaline OER.

Various embodiments of the invention have been described in fulfillment of the various objectives of the invention. It should be recognized that these embodiments are merely illustrative of the principles of the invention. Numerous modifications and adaptations thereof will be readily apparent to those skilled in the art without departing from the spirit and scope of the invention.

EMBODIMENTS

The following embodiments describe various additional and/or alternative aspects and configurations of methods of making composite core-shell nanoparticles described herein. These embodiments are merely exemplary and should not be interpreted as limiting this disclosure.

Embodiment 1. A method of making Ni—Fe core-shell nanocatalysts, comprising forming a $NiO_x$ or $FeO_x$ nanoparticle core and coating the $NiO_x$ or $FeO_x$ nanoparticle core with a $NiO_x$ or $FeO_x$ shell.

Embodiment 2. The method of embodiment 1, wherein the $NiO_x$ or $FeO_x$ nanoparticle core is formed by thermal decomposition of a first organometallic Ni or Fe complex in a high-boiling temperature organic solvent.

Embodiment 3. The method of embodiment 2, wherein the first organometallic Ni complex comprises nickel acetylacetonate ($Ni(acac)_2$) and the first organometallic Fe complex comprises iron acetylacetonate ($Fe(acac)_2$).

Embodiment 4. The method of embodiment 2, wherein the high-boiling temperature organic solvent has a boiling point of 180° C. or higher.

Embodiment 5. The method of embodiment 2, wherein the high-boiling temperature organic solvent comprises octadecene, oleylamine, or a mixture thereof.

Embodiment 6. The method of embodiment 2, further comprising adding trioctylphosphine to the high-boiling temperature organic solvent.

Embodiment 7. The method of embodiment 2, wherein the coating of the $NiO_x$ or $FeO_x$ nanoparticle core with a $NiO_x$ or $FeO_x$ shell comprises thermally decomposing a second organometallic Ni or Fe complex in the high-boiling temperature organic solvent in the presence of the $NiO_x$ or $FeO_x$ nanoparticle core.

Embodiment 8. The method of embodiment 7, wherein the first and second organometallic Ni complexes are different, and the first and second organometallic Fe complexes are different.

Embodiment 9. The method of embodiment 7, wherein the second organometallic Ni complex comprises bis(1,5-cyclooctadienenickel(0)), and the second organometallic Fe complex comprises $Fe(CO)_5$.

Embodiment 10. The method of embodiment 1, wherein the forming and coating steps are performed sequentially.

Embodiment 11. The method of embodiment 1, further comprising oxidizing the Ni—Fe core-shell nanoparticles.

Embodiment 12. The method of embodiment 1, wherein the Ni—Fe core-shell nanoparticle is a $NiO_x$—$NiO_x$/$Fe_x$ core-mixed shell nanoparticle or a $FeO_x$—$NiO_x$ core-shell nanoparticle.

Embodiment 13. A method of making Ni—Fe alloy nanocatalysts, comprising thermally decomposing a mixture of an organometallic Ni complex and an organometallic Fe complex in a high-boiling temperature organic solvent.

Embodiment 14. The method of embodiment 13, wherein the organometallic Ni complex comprises $Ni(acac)_2$.

Embodiment 15. The method of embodiment 13, wherein the organometallic Fe complex comprises $Fe(acac)_2$.

Embodiment 16. The method of embodiment 13, wherein the high-boiling temperature organic solvent has a boiling point of 180° C. or higher.

Embodiment 17. The method of embodiment 16, wherein the high-boiling temperature organic solvent comprises octadecene, oleylamine, or a mixture thereof.

Embodiment 18. The method of embodiment 13, further comprising thermally decomposing the mixture of the organometallic Ni complex and the organometallic Fe complex in the presence of trioctylphosphine.

Embodiment 19. The method of embodiment 13, further comprising oxidizing the Ni—Fe alloy nanoparticle.

Embodiment 20. The method of embodiment 13, wherein the Ni—Fe alloy nanoparticle is a $NiO_x$/$FeO_x$ alloy nanoparticle.

Embodiment 21. A method of lowering the applied potential of an oxygen evolution reaction comprising conducting electrolysis of water in the presence of a $NiO_x$—$NiO_x$/$Fe_x$ core-mixed shell nanoparticle, an $FeO_x$—$NiO_x$ core-shell nanoparticle, or a $NiO_x$/$FeO_x$ alloy nanoparticle.

Embodiment 22. A method of making Ni—Fe nanocatalysts, comprising thermally decomposing an organometallic Ni complex and an organometallic Fe complex in a high-boiling temperature organic solvent.

Embodiment 23. The method of embodiment 22, wherein the organometallic Ni complex and the organometallic Fe complex are thermally decomposed sequentially.

Embodiment 24. The method of embodiment 23, wherein one of the organometallic Ni complex and the organometallic Fe complex is thermally decomposed to first form a $NiO_x$ or $FeO_x$ nanoparticle core; and the other of the organometallic Ni complex and the organometallic Fe complex is then thetinally decomposed to form a NiO$_x$ or FeO$_x$ shell on the NiO$_x$ or FeO$_x$ nanoparticle core.

Embodiment 25. The method of embodiment 22, wherein the organometallic Ni complex and the organometallic Fe complex are thermally decomposed simultaneously to form a NiO$_x$/FeO$_x$ alloy nanoparticle.

Embodiment 26. The method of embodiment 22, wherein the organometallic Ni complex is bis(1,5-cyclooctadienenickel(0), nickel acetylacetonate (Ni(acac)$_2$), or both.

Embodiment 27. The method of embodiment 22, wherein the organometallic Fe complex is Fe(CO)$_5$, iron acetylacetonate (Fe(acac)$_2$) or both.

Embodiment 28. The method of embodiment 22, wherein the high-boiling temperature organic solvent is has a boiling point of 180° C. or higher.

Embodiment 29. The method of embodiment 22, wherein the high-boiling temperature organic solvent comprises octadecene, oleylamine, or a mixture thereof.

Embodiment 30. The method of embodiment 22, further comprising thermally decomposing the organometallic Ni complex and/or organometallic Fe complex in the presence of trioctylphosphine.

The invention claimed is:

1. A composition comprising:
   composite nanoparticles, the composite nanoparticles including a nickel oxide core and oxide shell, the oxide shell comprising a mixture of nickel and iron.

2. The composition of claim 1, wherein the nickel oxide core is amorphous.

3. The composition of claim 1, wherein the oxide shell has a thickness of 0.1-3 nm.

4. The composition of claim 1, wherein the composite nanoparticles further comprise a nickel hydroxide phase.

5. The composition of claim 4, wherein the nickel hydroxide phase comprises iron atoms.

6. The composition of claim 4, wherein the nickel hydroxide phase is a primary phase of nickel atoms in the composite nanoparticles.

7. The composition of claim 4, wherein the nickel hydroxide phase is a dominant phase of the composite nanoparticles.

8. The composition of claim 1, wherein the composite nanoparticles are catalytically active for oxygen evolution reactions.

9. The composition of claim 1, wherein a ratio of nickel to iron (Ni:Fe) in the oxide shell is 0.3 to 1.

10. The composition of claim 1, wherein the oxide shell is functionalized with one or more ligand species.

11. The composition of claim 10, wherein the one or more ligand species comprise one or more hydrophilic moieties.

12. The composition of claim 1, wherein the oxide shell is amorphous.

13. The composition of claim 1, wherein the iron is present as γ-Fe$_2$O$_3$.

14. The composition of claim 1, wherein the composite nanoparticles are substantially spherical.

15. An electrode comprising:
    a substrate; and
    a coating of composite nanoparticles on the substrate, the composite nanoparticles including a nickel oxide core and oxide shell, the oxide shell comprising a mixture of nickel and iron.

16. The electrode of claim 15, wherein the substrate is a transition metal or transition metal alloy.

17. The electrode of claim 15, wherein the substrate comprises carbon nanoparticles.

18. The electrode of claim 15, wherein the composite nanoparticles further comprise a nickel hydroxide phase.

19. The electrode of claim 18, wherein the nickel hydroxide phase is a primary phase of nickel atoms in the composite nanoparticles.

20. The electrode of claim 18, wherein the nickel hydroxide phase is a dominant phase of the composite nanoparticles.

* * * * *

UNITED STATES PATENT AND TRADEMARK OFFICE
CERTIFICATE OF CORRECTION

| | | |
|---|---|---|
| PATENT NO. | : 11,655,552 B2 | Page 1 of 1 |
| APPLICATION NO. | : 16/818249 | |
| DATED | : May 23, 2023 | |
| INVENTOR(S) | : Jingyi Chen et al. | |

It is certified that error appears in the above-identified patent and that said Letters Patent is hereby corrected as shown below:

On the Title Page

Item (72) Inventors:  Jingyi Chen, Fayetteville, NC (US); correct residence to read as --Fayetteville, AR (US)--
Prashant Acharya, Fayetteville, NC (US); correct residence to read as --Fayetteville, AR (US)--

Signed and Sealed this
Twenty-eighth Day of November, 2023

Katherine Kelly Vidal
*Director of the United States Patent and Trademark Office*